Aug. 14, 1962     A. G. BASTIAANSE     3,049,089
MARINE PROPULSION SYSTEM AND ENGINE
Filed July 5, 1956     10 Sheets-Sheet 1

*INVENTOR.*
ABRAHAM G. BASTIAANSE

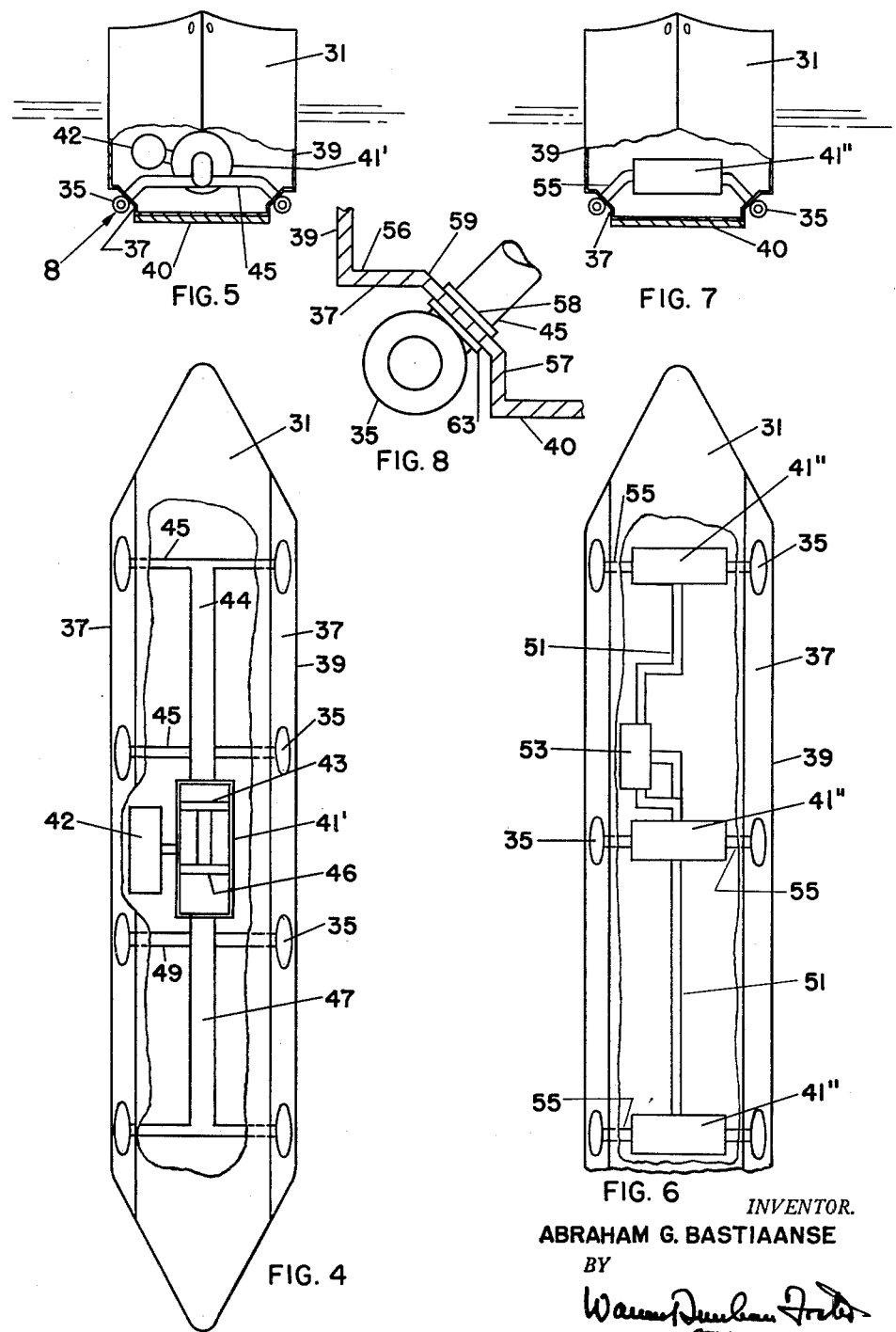

Aug. 14, 1962     A. G. BASTIAANSE     3,049,089

MARINE PROPULSION SYSTEM AND ENGINE

Filed July 5, 1956     10 Sheets-Sheet 3

*INVENTOR.*
ABRAHAM G. BASTIAANSE

*INVENTOR.*
ABRAHAM G. BASTIAANSE
BY

Aug. 14, 1962  A. G. BASTIAANSE  3,049,089
MARINE PROPULSION SYSTEM AND ENGINE
Filed July 5, 1956  10 Sheets-Sheet 6

INVENTOR.
ABRAHAM G. BASTIAANSE
BY
Attorney

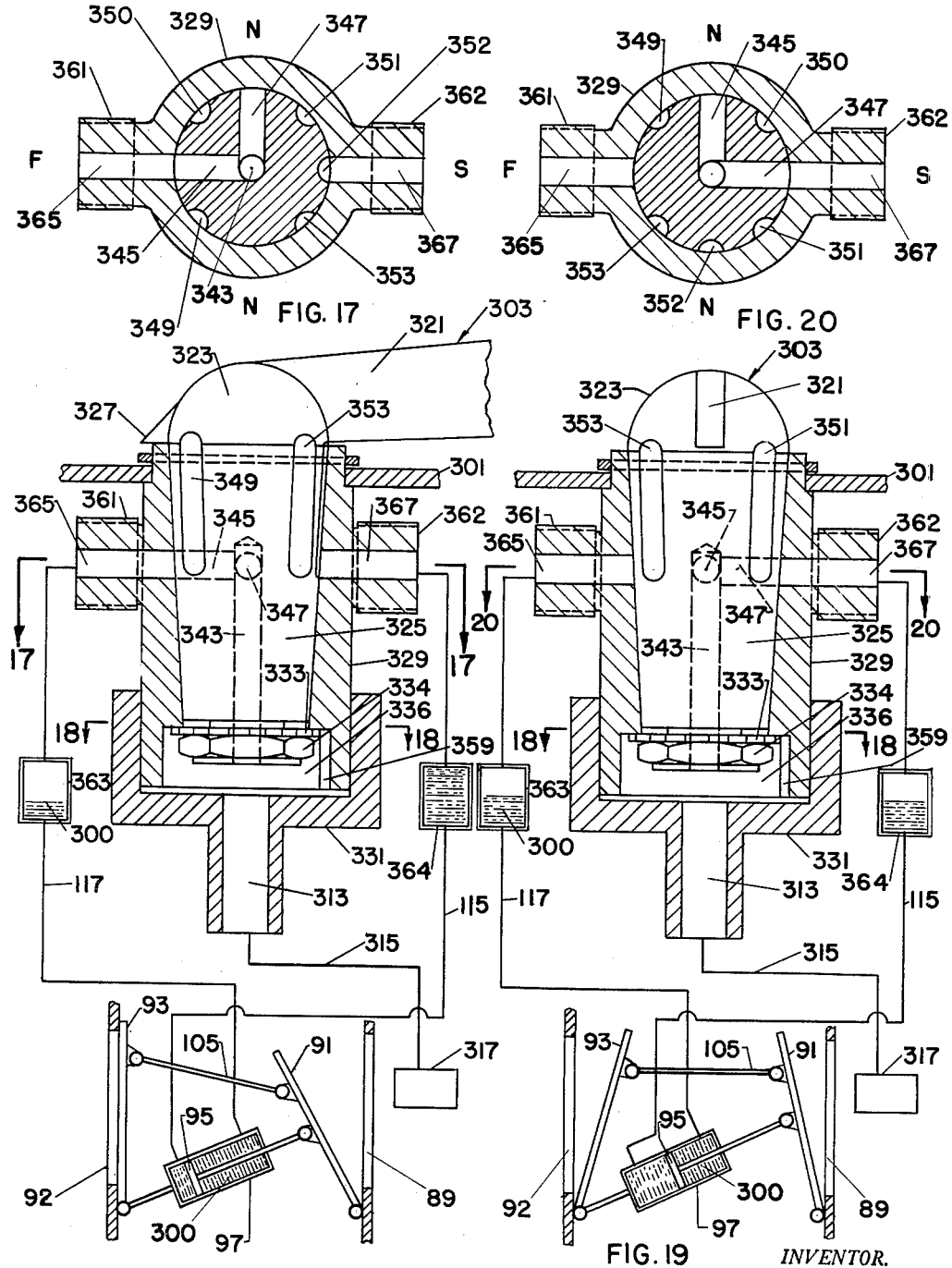

Aug. 14, 1962 A. G. BASTIAANSE 3,049,089
MARINE PROPULSION SYSTEM AND ENGINE
Filed July 5, 1956 10 Sheets-Sheet 8

INVENTOR.
ABRAHAM G. BASTIAANSE
BY
Attorney

INVENTOR.
ABRAHAM G. BASTIAANSE

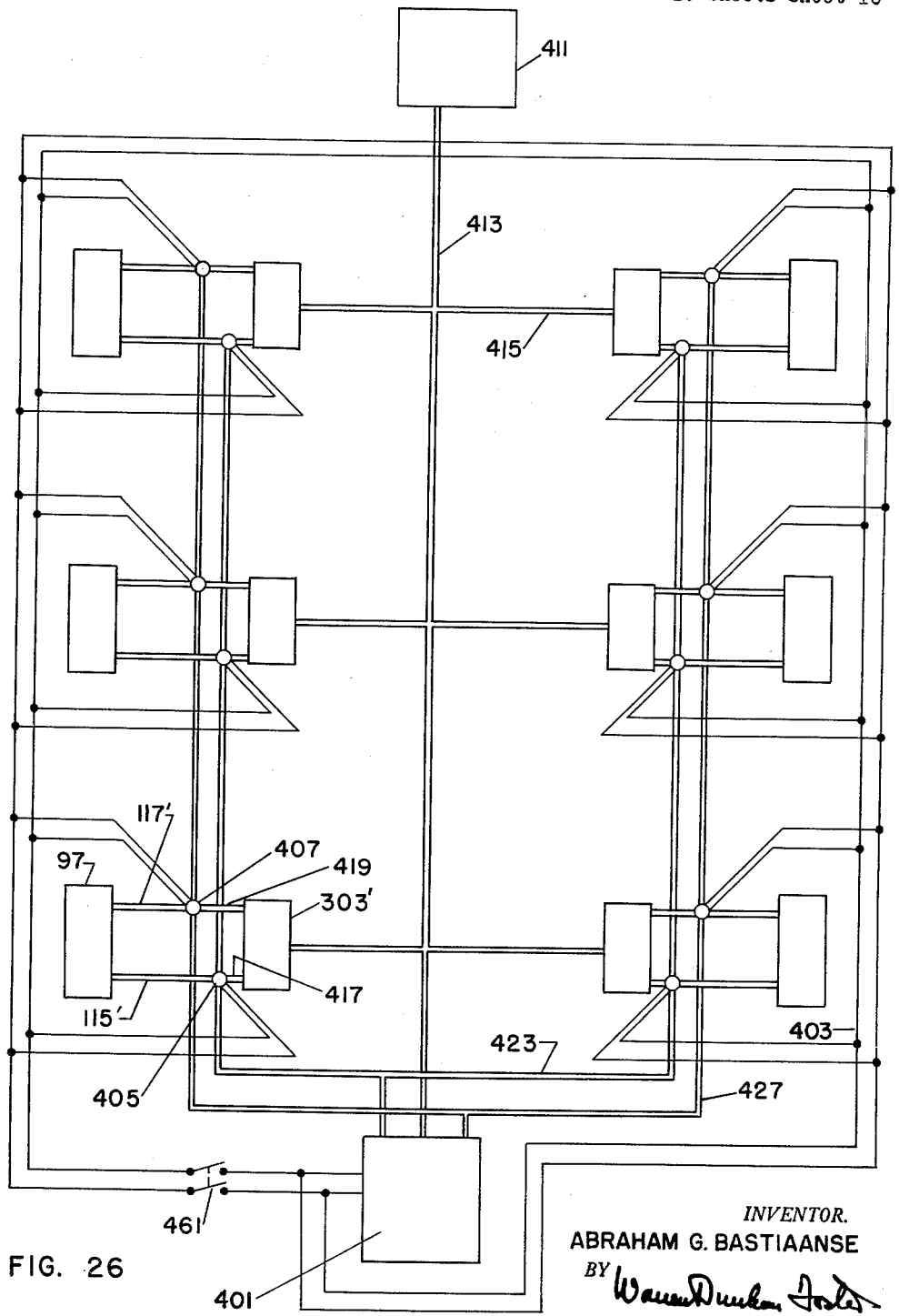

United States Patent Office 3,049,089
Patented Aug. 14, 1962

3,049,089
MARINE PROPULSION SYSTEM AND ENGINE
Abraham G. Bastiaanse, 162 Main St., Unionville, Conn.
Filed July 5, 1956, Ser. No. 596,091
25 Claims. (Cl. 115—14)

A chief object of this invention is through a fluid under intermittent impulses in a closed channel directly to operate propulsive units which directly apply propulsive force against water in which a ship floats thus moving the ship in a desired direction. This object includes avoidance of any substantial intermediate translation of force and provides instrumentalities which move the ship continuously which are always in operative contact with the water irrespective of its turbulence. An important element of my invention is the provision of such a closed channel with a propulsive fluid therein which is completely divorced from the water in which the ship floats, my system thus being protected from the debris, marine life and other organisms and corrosion which always exist in navigable waterways. Preferably these propulsive units are placed low in the water within a vertical projection of the cross-section area of the hull which is adjacent the water line thereby not interfering with streamlining.

Another related object hereof is provision of a novel engine or pump which applies such power strokes to the propulsive fluid in a manner peculiarly well adapted to my invention. Another and allied object is to make available for any appropriate purpose a novel and simplified two-cylindered engine or pump, operated by steam or other expansive gas, which supplies sharp power strokes in alternate directions in almost instantaneous succession.

Preferably I install a plurality of such propulsion units upon each side of a ship. Although the description hereof is based upon a plurality of units, I may carry out my invention with a single unit, or one unit only on each side of a hull. A related object is to provide a simple control system, preferably placed on the bridge of a ship, for such units (and for any valves or other units requiring similar actuation) which instantly operates each unit to apply force in a forward direction or astern or to hold a unit in neutral, such system as illustrated consisting of individual controls or actuators, one for each unit, which if and when desired may be superseded by a master control jointly operated all thereof. Thus my invention makes possible the maneuvering of a ship in a manner which is more facile and quick than any which is known to me.

A ship with my system responds instantly and with a minimum interference from weather conditions. As a consequence a rudder is unnecessary although often desirable, and, in entering or leaving a dock, tugs ordinarily are not needed.

A related object is the provision of an improved control system per se, including one wherein an incompressible liquid operates control instrumentalities and this liquid in turn is actuated by a gas, such as air, under compression which is subject to manual control. A related object is provision of a control mechanism comprising a plurality of individually operable units or actuators which instantly can be superseded by a master control or actuator, this master control in turn being subject to instant disablement and the automatic substitution of the original individual control units each when again made operative being disposed in the same relation to its controlled unit as it was when the master control took over.

For many years inventors have attempted the use of movement of a liquid to propel ships. So far as I know all such efforts have failed. These previous devices have attempted to supply motive force by pumping or otherwise moving water from that in which a ship floats through channels in or associated with a ship. Such movement of this water thus theoretically directly propels the ship. My invention has no essential resemblance to these early efforts. One of many difficulties preventing the success of such a system has been interference from debris of various kinds and from fish, seaweed and other organisms.

I provide a closed propulsive circuit within the ship with clean fluid subjected to periodic or intermittent power impulses. This circuit includes preferably a plurality of propulsive units disposed well below the water line. Each unit includes preferably two elastic motion-transmitting diaphragms, each of which forms a movable or elastic motion-transmitting face or wall, in direct contact with the water under all conditions of turbulence, except those of great infrequency which would wreck a ship. One of these motion-transmitting diaphragms is so disposed that when it is expanded by application of force thereto by a fluid it drives the ship in one direction, say forwardly, and another that when it is so expanded drives the ship in the other direction, say astern. A simple valve applies this fluid to the selected diaphragm, or to both when a neutral position is desired. My propulsive fluid must be compressible to a very small extent, say preferably distilled water, glycerine or, if the diaphragms are of a substance which will not be injured thereby, a light oil. Channels connect each propulsive unit with an engine which exerts upon the fluid quick successive movements, such successive movements of the fluid, as under the impulses of an engine such as that later described, acting as the source of power for my system. My system is such that the contact between the outside of each elastic motion-transmitting membrane and the wall of water encompassing it is continuous, as is the pressure between it and the force-applying fluid in my closed system. That latter pressure while continuous is not constant, for with each propulsive impulse delivered by the engine the elastic membrane expands thereby transmitting motion to the vessel, but without shock.

I can make use of either one engine for all diaphragms or one engine for paired diaphragms, preferably one upon one side and the other upon the other side of the ship, or I may use one engine for each diaphragm, in each case preferably fed from a common source of steam or other expansive gas. In these preferred forms utilizing a plurality of units, there is no idle stroke of any engine, since each reciprocation furnishes power impulses to the closed circuit. If I use a plurality of engines, one, if it causes difficulty, can be replaced while the others continue to drive the ship. This replacement is possible because of their extreme simplicity. I can place my engine very low in the ship so that it requires a minimum of space thereby increasing cargo carrying capacity. Also, in a small ship, the boiler can be placed on deck, since the connection between it and its engine(s) is by steam line. Since the only connection between each engine and the propulsion units driven thereby is tubing I have great freedom for positioning each part, as is among the objects of my invention. Preferably all control of the force applied to a ship using my system is through the propulsive units, the engine operating in one direction only and at a uniform output of force, at least if I use a plurality of propulsion units.

The engine which I provide is particularly applicable to this purpose because its reciprocation is almost instantaneous. A power stroke in one direction is succeeded within a very short interval with a power stroke in the other direction. Also it has the great advantage of a minimum number of parts and minimum likelihood of need of repairs or renewals. My novel engine can be used for other purposes and other sources of power can be used in my closed propulsion circuit.

As will be evident from the foregoing generalized and the following specific description, one highly important object of this invention is the complete streamlining of a hull of a ship, with no rudder or screws protruding to break the contour and to leave the water in heavy weather. Also, with my system vibration is reduced to a minimum. An object hereof is to supply a marine propulsion system of the above characteristics. An object related thereto is the provision of propulsion units which in addition to being wholly novel so far as I know are simple, rigid, easy to maintain and unlikely to go out of order.

Other objects, advantages and characteristics of this invention will be clear from the above generalized portion of this specification, the detailed description which follows, the subjoined claims and the accompanying drawings. Although I am showing only preferred forms of my invention for purposes of illustration it will be understood that changes can readily be made without departing from the scope of my broader claims or the spirit of my invention.

In the following description I shall first describe a preferred form of my propulsion units and the closed propulsion channels of which they are a part, then an engine which I have found particularly useful for powering them, thereafter a control system for my propulsion units wherein each unit is operated by a control separate from that of the others, and finally a system wherein I apply a master control which at any instant can disable the individual controls and jointly operate all propulsion units.

In the drawings:

FIGURE 4 (Sheet two) is a bottom plan view showing a common engine applied to all propulsion units.

FIGURE 5 is a schematic end elevation corresponding to FIGURE 4 and partially broken away of an especially constructed ship to which my invention is applied.

FIGURE 6 corresponds to FIGURE 4 but shows a separate engine for each two units, but with a closed propulsion circuit including all propulsion units, three on each side.

FIGURE 7 is an end elevation corresponding to FIGURE 6 and partially broken away.

FIGURE 8 is an enlarged fragment of a portion of FIGURES 5 and 7, as indicated by the arrow applied to FIGURE 5.

Figures 9, 10:
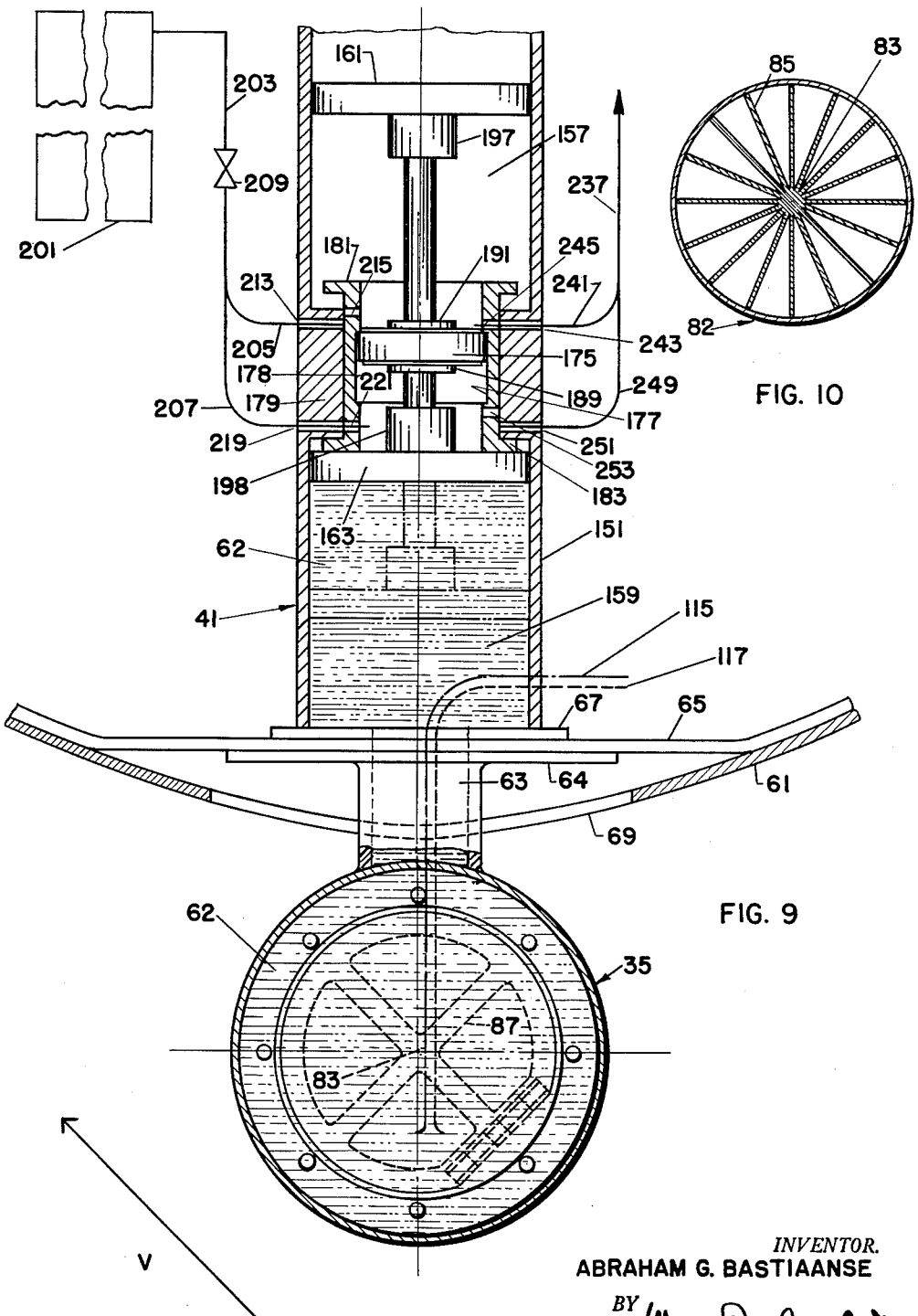

FIGURE 9 (Sheet three) is a horizontal view, partly in section and partly in elevation, showing a propulsion unit together with my engine attached thereto.

Figure 2:
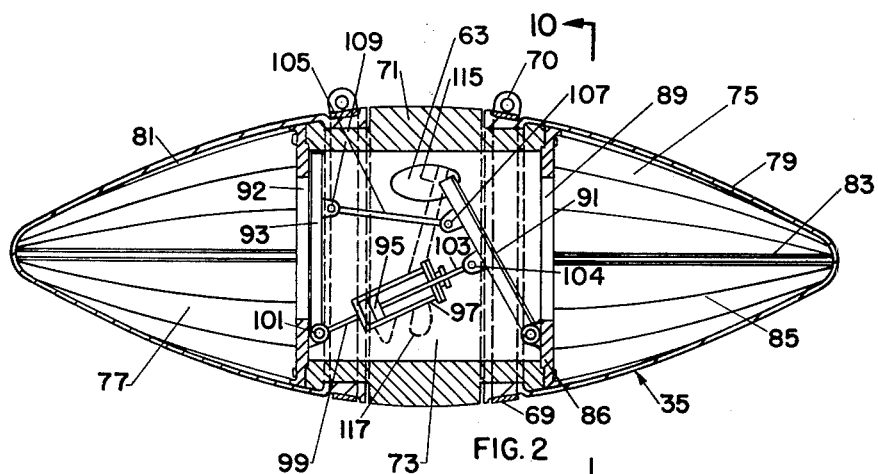
FIGURE 2 is a longitudinal section of a propulsion unit, with its elastic membranes collapsed.

FIGURE 10 is a section taken on the line 10—10 of FIGURE 2.

Figure 11:
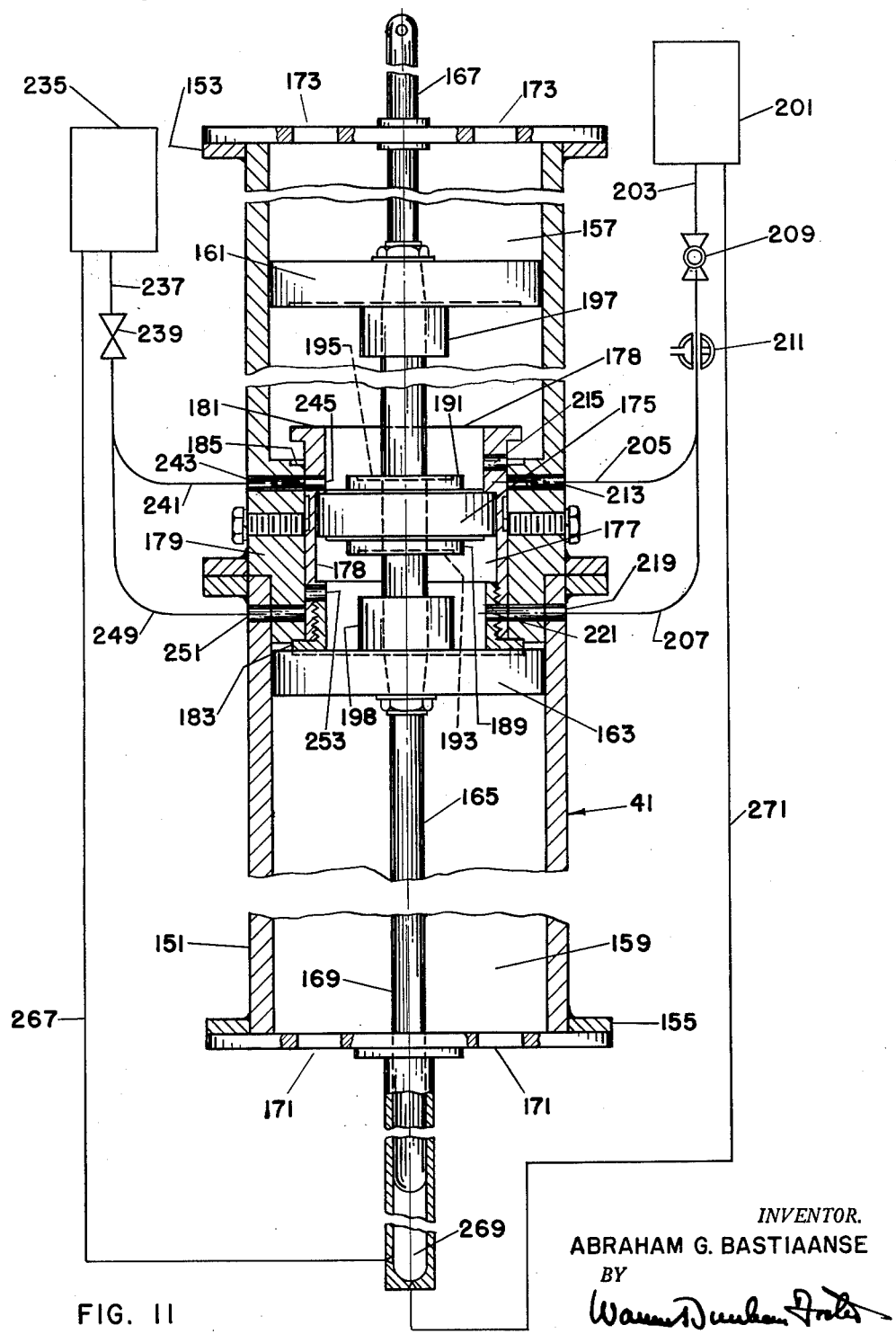

FIGURE 11 (Sheet four) is a horizontal central section partly broken away showing my novel engine of a type particularly well adapted to drive my propulsion units although its usefulness is not limited thereto.

FIGURES 12 to 15 are partial sections illustrating different operating positions of my engine.

Figure 12:
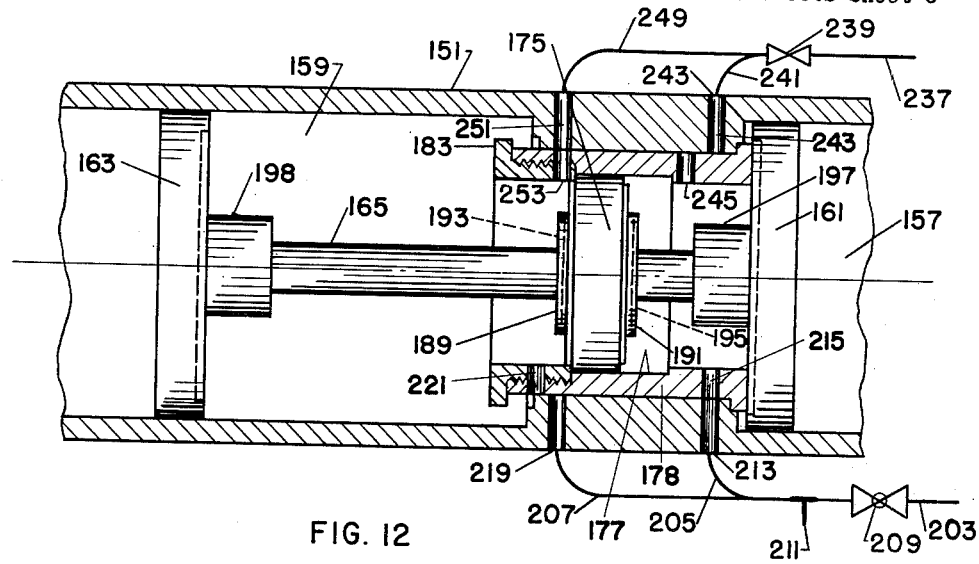

FIGURE 12 (Sheet five) shows the engine in normal running operation with the parts oppositely disposed from the showing of FIGURE 11.

Figure 13:
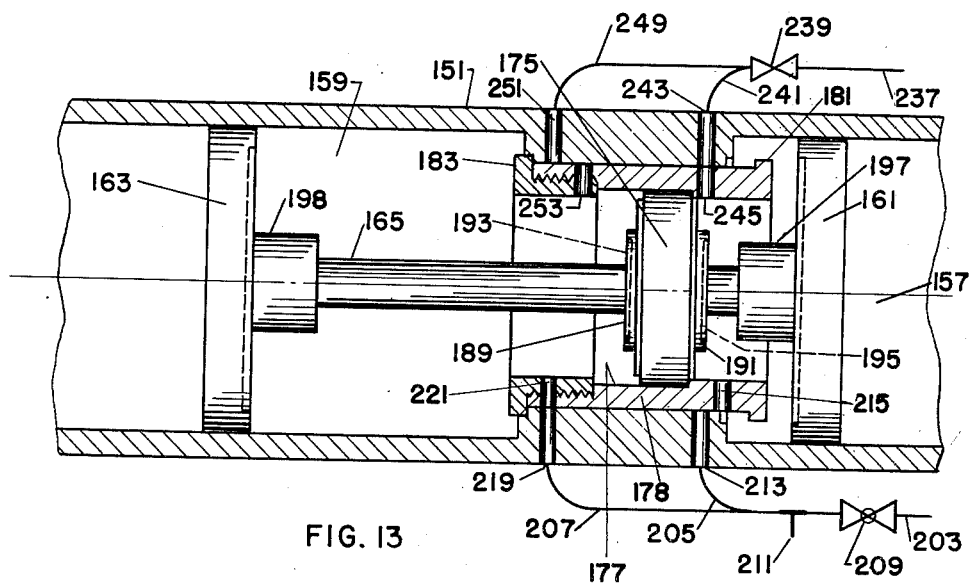

FIGURE 13, showing all control valves open, illustrates two possible positions; either the engine starting in reverse with the first resumed power-stroke of the engine in the same direction as the stroke prior to the stopped position illustrated by FIGURE 12; or alternatively in operating position intermediate that of FIGURES 9 and 10.

Figure 14:
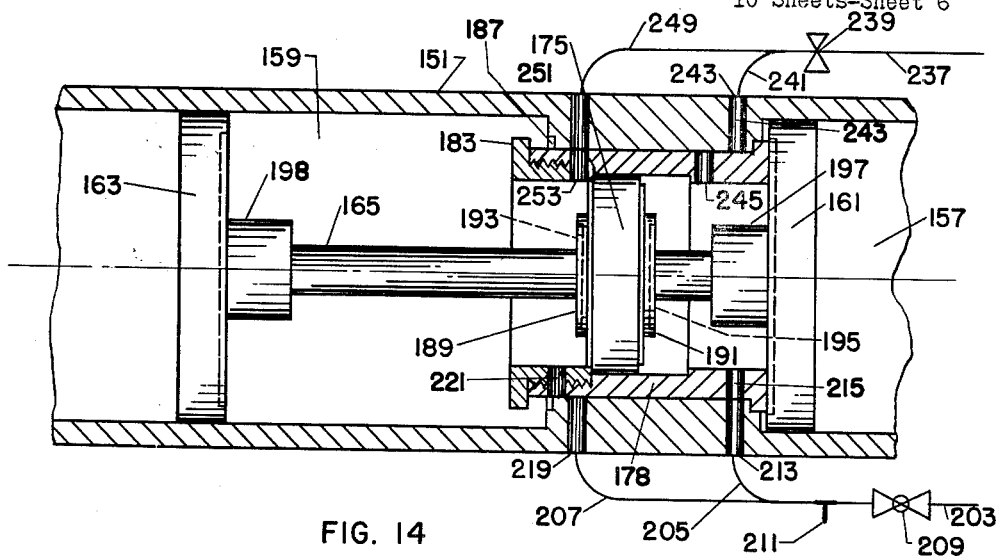

FIGURE 14 (Sheet six) shows the parts disposed as when an exhaust control valve is closed thereby stopping the engine but ready for movement of this control valve preparatory to future operation.

Figure 15:
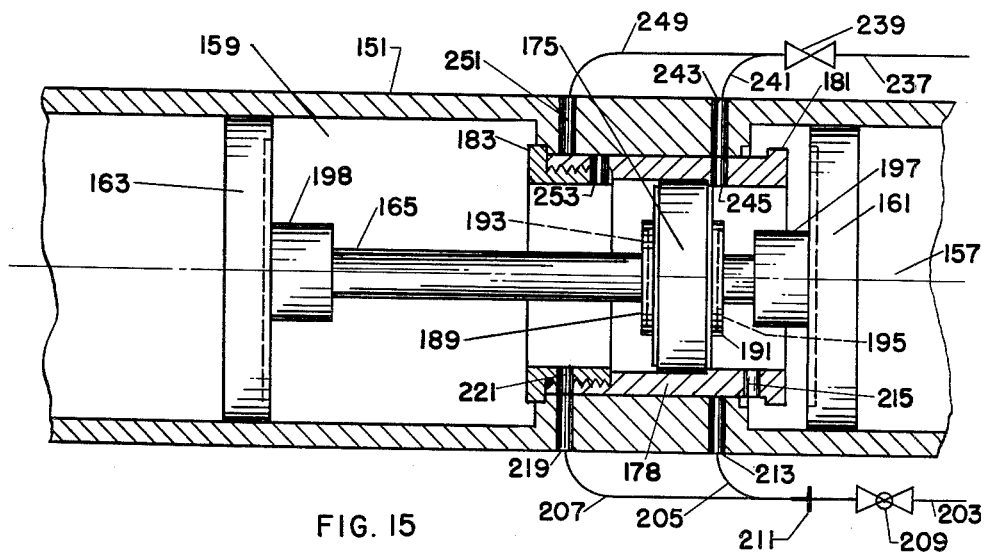

FIGURE 15 corresponds to FIGURES 9, 11 and 12 but shows a three-way control valve shutting off the in-put to the cylinder open to the atmosphere thereby allowing "free wheeling," or operation of the pistons by back-pressure as distinct from power in-put.

The remaining drawings illustrate by novel control system applied to my propulsion units.

FIGURE 16 is a vertical sectional view, partly schematic, of an individual control valve, for convenience herein called a "plug valve," showing a control handle in a position which operates a propulsion unit to cause forward movement.

FIGURE 17 is a section taken on the line 17—17 of FIGURE 16.

Figure 18:
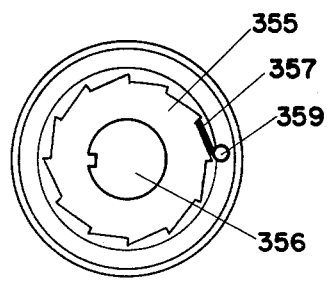

FIGURE 18 (Sheet ten) is a section taken on the line 18—18 of FIGURE 16.

FIGURE 19 (Sheet seven) is a view corresponding to FIGURE 16 but showing such a control valve in a neutral position.

FIGURE 20 is a section taken on the line 20—20 of FIGURE 19.

Figure 21:
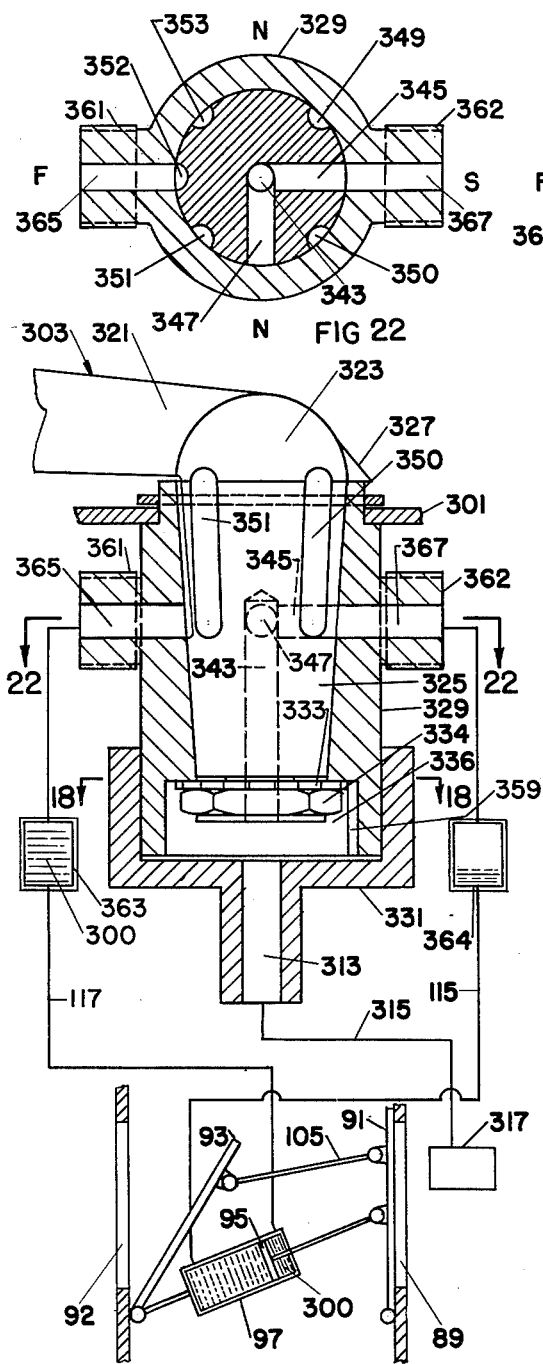

FIGURE 21 (Sheet eight) corresponds to FIGURES 16 and 19 but shows a control valve in a position which applies propulsive pressure in a reverse direction.

Figures 22, 23:
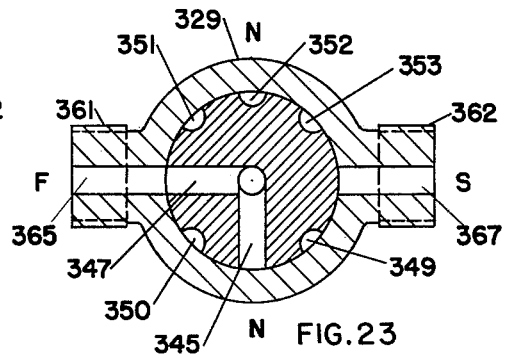

FIGURE 22 is a section taken on the line 22—22 of FIGURE 21.

FIGURE 23 is a sectional view corresponding to FIGURES 17, 20 and 22 but showing my control mechanism in a neutral position different in orientation but the same in function as that shown in FIGURE 19.

Figure 24:
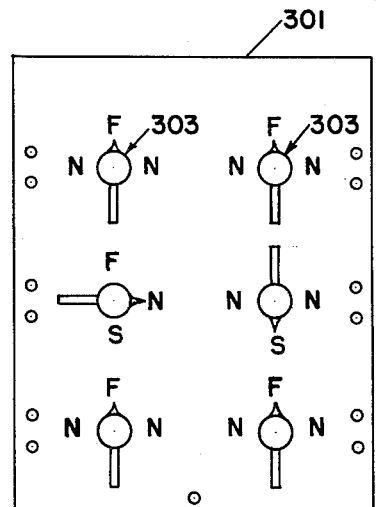

FIGURE 24 is a schematic view of a control panel wherein each of a plurality of propulsion units is operated independently of the other.

Figure 25:
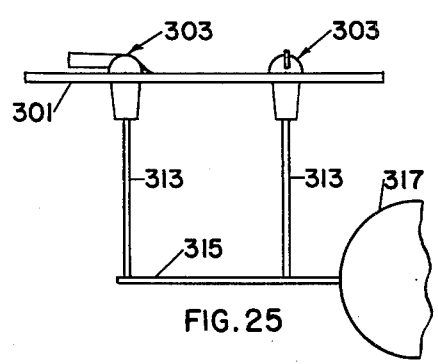

FIGURE 25 is a fragmentary side elevation generally corresponding to FIGURE 24 and diagrammatically illustrates connections between a source of control pressure and two of the control valves.

FIGURE 26 (Sheet nine) is a schematic view of a form wherein all of a plurality of propulsion units are operated by a master control which at any time takes over from the individual control units previously illustrated.

Figure 27:
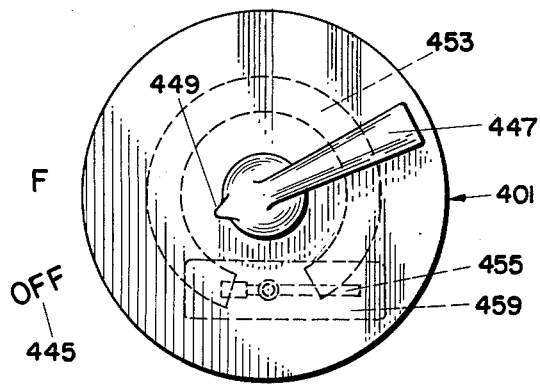

FIGURE 27 (Sheet ten) is a top plan view of such a master control valve.

Figure 28:
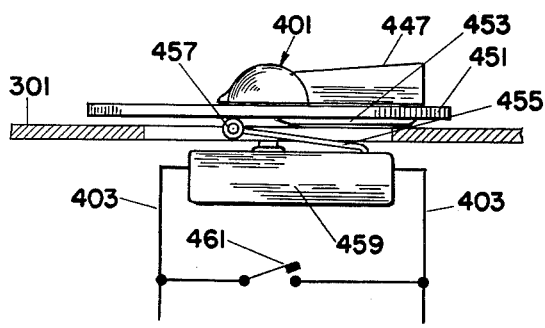

FIGURE 28 (Sheet ten) is a side elevation partly in section corresponding to FIGURE 27.

Figure 29:
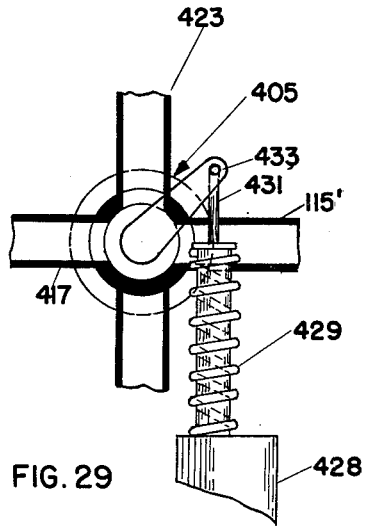
Figure 30:
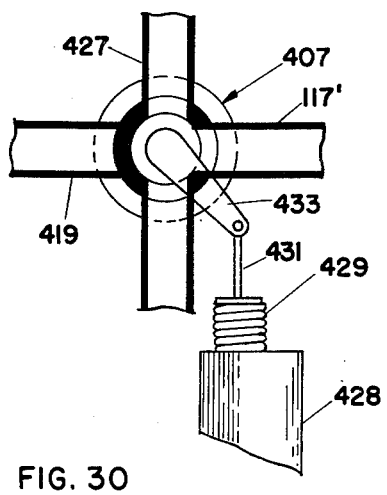

FIGURES 29 and 30 are fragmentary bottom plan views largely in section showing individual electrically controlled circular valves for each propulsion unit for the system of FIGURE 26.

FIGURE 29 shows such a valve when a master valve is disabled an operation is by each plug valve independently operated.

FIGURE 30 shows such a valve after the master valve has taken over.

Figure 1:
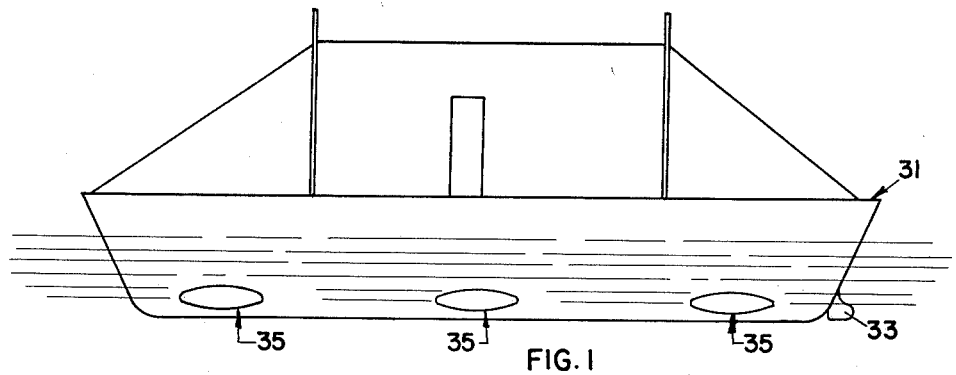
FIGURE 1 is a purely schematic elevational view of a ship to which my invention is applied.

Orientation in the following detailed description and in the sub-joined claims, except as noted therein, notably with stated reference to a particular figure and as set out immediately below, is of a ship in operative position. "Forward" and "backward" or "reverse," and "stern" or "astern" or "aft," "left" or "port," or "right" or "starboard" are from the standpoint of normal position of a ship and applied to all parts. When applied to my propulsion units the immediately preceding terms are used from the standpoint of operation, not position, as will later be clear. Likewise words indicating relative vertical position are from the standpoint of FIGURE 1, except when applied to a control mechanism. Normally a control panel such as that shown in FIGURE 24 is itself vertical but for ease in presentation words indicating relative position apply to my control valves assuming that such valves operate upon vertical axes as illustrated in such figures as 16, 19 and 21. "Inner" and "outer" are applied from the point of view of a ship or valve as a whole. Similar words are used with corresponding meanings. While I prefer to utilize a plurality of propulsion units or at least one such unit upon each side of a ship I can use only one propulsion unit for the entire craft. Consequently although I use plural words to designate these units they must be read as singular, and vice versa. For simplicity, I characterize my propulsive fluid as "incompressible" although it can be compressed to a very slight extent which is without practical significance.

For purposes of illustration I assume my invention as applied to a ship diagrammatically indicated as 31. A rudder 33 preferably is supplied, although in a ship equipped with a plurality my propulsion units with at least one on each side, a rudder is not necessary. I generally apply the reference character 35 to each of a plurality of propulsive units, three shown upon one side and three upon the other. Any desired number may be employed although it is desirable to have at least one upon each side and preferably an equal number. FIGURES 4 to 7 both inclusive illustrate diagrammatically my preferred arrangement of propulsion units in relation to the hull of a ship which has been especially built for my system. Preferably these units are disposed within continuous inwardly extending channels 37 in the hull 39 and within projections of the planes of both the bottom 40 of the ship and its sides. By this arrangement the units are well protected and streamlining is not disturbed. In any event, even if my propulsion units are mounted upon the hull of an existing ship as in FIGURE 1, it is important that they be as low in the water as practicable so that pitching or rolling except perhaps in very unusual storms does not bring them out of the water.

As made clear in the preceding generalized portion of this specification each propulsion unit is powered by an incompressible fluid, which is circulated under rigid control throughout a closed propulsion circuit having no connection with the water in which a ship floats, thus differentiating in this factor alone so far as I know from all previous proposals to use any fluid or liquid for ship propulsion. Each unit and the cylinder of an engine which moves the propulsive fluid form a part of this closed circuit.

My preferred form of engine 41 is shown in detail in FIGURES 9 and 11 to 15, both inclusive, but any adequate device which imparts a succession of quick and sharp power impulses to the propulsive fluid can be used. An engine or pump with two pistons reciprocating together (or a single sided piston in a single cylinder) is particularly desirable so that each stroke applies power.

FIGURES 4 to 7, both inclusive, schematically show arrangements of engines and propulsive circuits. As illustrated in FIGURES 4 and 5, engine 41', which may be of the same preferred type as 41, fed by a boiler 42 on one stroke of its piston 43 through a closed circuit 44 having branches 45 gives propulsive impacts to the fluid therein which drives the two forward pairs of units 35 while on the other stroke piston 46 acting through closed circuit 47 with branches 49 powers the fluid for the two pairs of after units. As illustrated in FIGURES 6 and 7, each of three engines 41", all fed through pipes 51 by a single boiler 53, applies force to propulsive fluid within three closed circuits 55 respectively, each of which is connected to two oppositely disposed propulsion units.

FIGURE 8 shows how each propulsion unit 35 can be attached to a hull of a ship 31 within the horizontal cross sectional area of channel 37. This channel comprises a first surface 56 at right angles to a vertical side 39 of the hull, a second surface 57 at right angles to the bottom and an intermediate or third surface 58 joining the two and to which the propulsive unit is attached, as indicated in detail in FIGURE 9, although as shown in FIGURE 8 the propulsive fluid is delivered through branch 45 of an extended circuit 44 and not substantially directly by an engine.

Figure 3:
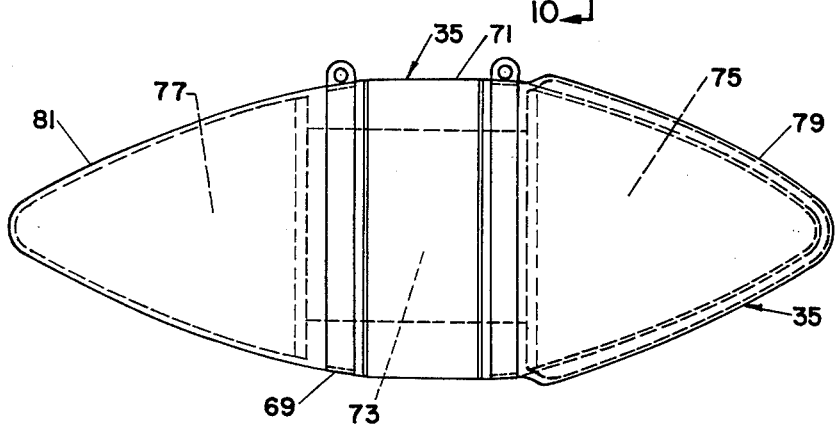
FIGURE 3 is a side elevation of a propulsion unit corresponding to FIGURE 2 but showing a propulsion membrane expanded and in power-transmitting position.

In FIGURE 9 I show a propulsion unit 35 attached to a hull 61 of a ship without the use of a channel such as 37. A circulating force-transmitting fluid 62 reaches the propulsion unit through a heavy conduit, shown in detail as in FIGURE 9 as 63, attached to a cross support or plate 64 disposed slightly inwardly of the outer hull. As shown in FIGURE 9 an engine 41 is directly connected through this conduit with the propulsion unit. This conduit, which is rigid and heavy, by a sealed or bushed outer plate 65 is disposed opposite a similar plate 67 upon the other or inner side of the cross support, the outer plate being wider than the inner plate so that it can be bolted to and unbolted from the cross support 64 independently of the inner plate, which preferably is independently screwed into position. Two strips 69, each bolted together at 70, secure each diaphragm to its propulsive unit, as seen in FIGURES 2 and 3. The arrow V in FIGURE 9 indicates substantially a vertical direction from the standpoint of a ship.

These methods of attachment facilitate the bodily removal of each unit at sea, without even stopping the ship, by use of the devices therein described and claimed, if substantial repairs are necessary, and the substitution of another unit. This operation is necessarily carried out from the exterior of the hull, but with simple and automatically operative devices of said continuing application not requiring any workman to enter the water.

As will best be seen in FIGURE 2, each propulsion unit is generally ovoid. It includes a central rigid and solid central cylinder 71 into which this conduit 63 leads. Within this central cylinder is an operating compartment 73 which is one of the three chambers within each unit. A "forward" propulsion chamber or element 75 and a "reverse" propulsion chamber or element 77 complete the over-all structure of each unit. The "forward" chamber, which when actuated forces a ship to move ahead is actually aft of the "reverse" chamber which upon the admission of propulsive fluid thereto forces the ship to move astern. The portion of each of these propulsion chambers which engages the water in which the ship floats is enveloped by elastic, motion-transmitting membranes 79 and 81 respectively, the qualities of each of which later will be described. It is the expansion of these membranes following application of force from an incompressible fluid upon the inside of each thereof which moves the ship in the required direction.

A skeleton or framework for each propulsion chamber, generally indicated as 82 and shown in section in FIGURE 10, comprises a central longitudinal axial beam 83 formed with or attached to radial wings 85 each of which tapers towards the narrow ends of its operating chamber whereat the wings and beams converge. When the membrane is not in itself expanded or in propelling position this skeleton supports it. Each beam and its wings are attached to a transverse frame with an outer annulus 86 with a silder 87, this frame being bolted or otherwise affixed to the central rigid cylinder 71.

A single valving system or controlling mechanism is provided for controlling each propulsion unit. This controlling mechanism selectively directs the propulsive fluid alternatively to each chamber, for propulsion forwardly or astern respectively, or to enter both chambers, as seen in FIGURE 19, to place the unit in neutral position. An opening 89 (in the spider) leads from the central operating chamber 73 to the forward operating chamber 75 and is closable at will by a door 91 hinged upon annulus 86. Similarly an opening 92 leads from the operating chamber to the reverse operating chamber 77 and is closable by a door 93. Both of these doors are operated by movement of a piston 95 within a cylinder 97 disposed within the operating chamber 73. This cylinder is supported by a shaft 99 pivoted at 101. Piston 95 by a shaft 103 is pivoted at 104 to door 91 and operates it in accordance with the position of the piston within the cylinder. Door 91 is attached to and operates door 93 by a rod 105 which at 107 is pivoted to the side of the door most distant from the forward propulsion chamber and at 109 is pivoted to the relatively adjacent side of the door 93 leading to the reverse chamber 77.

Two control connections or hoses or pipes 115, shown in dash-dot line, and 117, shown in a dashed line, connect my hydraulic control system, later described in detail, and cylinder 97, one upon one side and the other upon the other side of the piston 95. It must be understood that the actuating fluid in my control system and the fluid in my propulsion system and their pipes are entirely independent and can never mingle although as a convenience in construction the pipes for the control system are disposed within those for the propulsive fluid.

The fluid which I employ in this closed propulsive circuit preferably should be one which can be compressed to only a slight degree and hence has the characteristics which a physicist associates with a liquid and will not harm whatever material, such as natural rubber for example, which is used for the elastic motion-transmitting membranes. For simplicity I employ the word "incompressible" to designate such fluid, because the extent of compressibility of the fluids which I employ (e.g. water) is so slight or unusual under ordinary conditions that it is of only academic importance. Distilled water is excellent because it has the desirable qualities noted above, is cheap and readily available. There is no danger of freezing because the fluid is in contact with the membranes which in turn are in contact with the water in which the vessel rides at a point of sufficient depth so that there is no freezing. Distilled water is preferable to ordinary water because it is free from calcium or other substance which might be deposited in the channel or units. If desired a light oil, provided the membrane is of a material which will not be injured thereby, or glycerin may be substituted for water.

I emphasize that the pressure upon each elastic membrane is continuous. That is to say the exterior surface of each elastic membrane is positioned against a solid mass of water which is in contact with all portions of the membrane because each unit is placed so low in relation to the ship that it never comes above the surface of the water, except under conditions so unusual as to be likely to wreck the vessel. When any motion-transmitting membrane is not under internal liquid pressure it is supported by the internal web. Consequently tensile strength of the membrane need be sufficient only to retain the propulsive fluid which is in contact with its inner surface without bursting. Note that one liquid, say for example distilled water, under force is pressed against one side of a membrane the other side of which in turn presses against another liquid which is of great mass and volume. In the power stroke of each unit it may be assumed that the pressure per square inch of the internal mass of liquid against the interior surface is at the rate of say 200 pounds per square inch. Assuming a depth below the water line of each propulsion unit of slightly over twenty feet the pressure of (fresh) water against the outside of the membrane is approximately eight pounds per square inch. As the piston of the engine quickly reverses its stroke the pressure of the outside water decreases very rapidly. Consequently the force-resisting quality of the membrane at any time must be enough merely to withstand the pressure of the internal fluid. This pressure may be assumed to be 200 pounds per square inch. That or some other maximum is set by the construction of the device and cannot be exceeded.

There are no hammer blows of the membrane through intervening air against the surrounding water. The contact is continuous, as is the pressure upon each side, although that pressure upon the respective sides varies quickly. There is no danger of ballooning and consequently bursting because the maximum inward pressure when not opposed by the propulsive fluid is supported by the skeleton.

In the above description I have spoken of a propulsive "fluid." In the practice of my invention I employ an incompressible liquid, because it is ideal for my purposes, as made clear above, notably because it is not compressed by the back pressure against the membrane of the water in which the ship floats and said incompressible liquid is free from ballooning. For many purposes, however, particularly when only certain elements of my invention and not its entire substance are employed, the propulsive fluid may be a gas. Such a gas, however, must be under pressure greater than that of the external water, and such pressure upon the gas must be exerted and released under suitable precautions.

Next I shall describe my preferred mechanism for delivery of propulsive fluid under pressure to the units. Then I shall explain how I prefer to control the position of doors 91 and 93 and consequently the operation of each propulsion unit of my marine propulsion system.

For the reasons set forth herein the engine or pump which I describe is peculiarly well adapted for use herewith although not limited hereto. Alternatively I may utilize any motive force which in a series of staccato impulses applies force to a closed circuit of a fluid such as I have described.

As perhaps will best be seen from a consideration of FIGURE 11 my engine 41 consists essentially of an exterior tubular body 151 with end plates 153 and 155 encompassing two cylinders 157 and 159 with a piston 161 in the first mentioned and a piston 163 in the second mentioned. These pistons are rigid with a central axial shaft 165.

As shown in FIGURE 11 this shaft is extended in each direction to form integral power-transmitting connections 167 and 169 respectively. Either or both of these connections can be attached to any mechanism, such for example as a generator, which it is desired to operate by the surplus power of the device. They also illustrate how by engine may be used as such, without detriment to my marine propulsion device, for which it was primarily developed. Extension 169 is shown as operating an injector. Paired openings 171 and 173 respectively disposed at each end of the engine can be connected to the piping of my closed circuit which operates my propulsion units through such connections as 44, 47, 55 and 63 as previously shown.

A characteristic element of my device is my central inner cylindrical valving member 175 which for convenience I call a hammer. This member, which is freely movable upon shaft 165, oscillates within an annular cylindrical opening or groove 177 formed in a central cylindrical valving member 178 which in turn oscillates freely within a fixed central cylindrical block or sleeve 179 extending inwardly from and rigid with the cylindrical casing 151 at the center thereof. This inner valving member terminates at each end in annular extensions 181 and 183 respectively which by engagement with cooperating annular grooves 185 and 187 respectively formed in the adjacent and parallel edges of the fixed cylindrical structure limit the oscillation of the inner valving member therewith, and also furnish "air pillows," which for simplicity are omitted from FIGURE 9.

Each side of the inner valving hammer is formed with a block 189 and 191 respectively, each having a central "air pillow" 193 and 195 respectively to reduce noise and shock. Attached to the inner wall of piston 161 is an actuating block 197 and to the inner wall of piston 163 an actuating block 198.

Assuming the engine to be fed by stream as distinct from other gas, such as compressed air or an explosive gas, a boiler 201, indicated diagrammatically, is connected by a main pipe 203 to a fixed intake lead 205 in the central portion of the cylindrical casing and serving cylinder 157 and to an intake lead 207 serving cylinder 159. This main steam in-put is controlled by a main one-way regulator valve 209, which does not permit movement of steam except from the boiler, and a three-way valve 211, important to the mode of aeration of my engine notably to provide what I term "free wheeling" only when used for general purposes but not necessary to my system of control when my engine is employed for the special purposes herein described. This steam in-put 205 joins an opening 213 in the central block 179. Branch 207 joins another intake opening 219 in this block. Ports 215 and 221 in the oscillating outer valving member 178 respectively alternatively coincide with these openings to supply steam to cylinders 157 and 159 in turn, as later explained. As shown in FIGURE 9, steam is being admitted through pipe 203 extension 207 and ports 219 and 221 to cylinder 159 between the hammer 175 and the piston 163 and is about to force the piston 163 downwardly.

Exhaust steam or other gas passes to a condensor indicated as 235 through a main pipe 237 controlled by an out-put valve 239, again not necessary to the control of my propulsion system. A branch 241 of this pipe 237 is attached to an outlet port 243, in the fixed cenrtal block 179, which through a port 245 in the cylindrical oscillating valve 178 is alignable with the interior of cylinder 157. Another branch 249 from pipe 237 through a port 251 in the central block is alignable with port 253 in the oscillating valving member through which cylinder 159 is exhaustable. Through a pipe 267 condensed steam is pumped through an injector 269 operated by shaft 169 and back through a pipe 271 to the boiler 201.

The operation of my engine is as simple as is its structure. The oscillating hammer valving member 175 forms the necessary partition between cylinders 157 and 159. Its unique function is to make certain and very rapid each change in the direction of stroke of the engine. Note that pistons 161 and 163 are rigid through the shaft 165. In the following description downward movement as shown in FIGURES 9 and 11 will be considered equivalent to leftward movement as shown in FIGURES 12–15 and vice versa. As pistons 161 and 163 reach the ends of their common strokes, upward as shown in FIGURES 9 and 11, piston 163 following engagement with oscillating central valving member 178 has brought the outlet port 245 of cylinder 157 in line with outlet branch 241 and blocks the connection between outlet ports 251 and 253 and branch 249. At the same time inlet ports 213 and 215 are blocked but the inlet ports 219 and 221 are aligned. Thereupon as steam enters the upward side of piston 163 that piston and likewise piston 161 are moved rapidly downwardly. The steam or other gas remaining in cylinder 157 is forced into the condensor. Thus the parts of my engine are quickly moved to the operating position shown in FIGURE 12 which corresponds to that of FIGURE 11 but with the parts reversed and ready for reciprocation in the opposite directions. What has happened between the positions of FIGURES 9 or 11 and 12 can be seen from FIGURE 13. although its primary purpose is to illustrate another position.

As previously stated the central or hammer valve 175 performs a function necessary in any reciprocating engine, that of forming a partition between the cylinders 157 and 159. Characteristic of my invention, however, is operation of this hammer to make rapid and certain each change in direction of stroke of the engine. As piston 161 is moved to the left toward the position as shown in FIGURE 12, the piston itself when it approaches but does not quite complete its extreme leftward travel makes contact with and moves the cylindrical valve 178 far enough so that the inlet ports 213 and 215 begin to admit steam and the outlet ports 251 and 253 begin to permit the steam on the opposite side to escape. This first contact in itself moves the hammer only slightly by engagement between the blocks 197 and 191. This introduction of fresh steam into the cylinder 157, however, immediately forces the hammer 175 with great velocity to the left against the leftward edges of the annular groove 177 and instantly forces or indeed knocks the main cylindrical valve 178 to its extreme leftward position. This operation takes place as the parts are moving between the positions of FIGURES 13 and 12 leftwardly as there shown. Similar results occur on the other or rightward stroke. Thus by supplementing the original movement which follows physical contact between the piston and the valving member 175 my invention makes the reversal of stroke of the pistons practically speaking instantaneous. This characteristic is particularly valuable when this engine is used with my propulsive system because it applies great and almost instant force to the fluid which is being put under pressure in the propulsion units.

Also and highly important is that this coaction of the hammer and the cylindrical valve as above stated makes certain that always there will be a decided difference in effective pressure upon each side of the valve. This quick movement of the cylindrical valve enforced by the hammer precludes the possibility of a dead center.

At the instant the leftward surface of the piston 161 moves the cylindrical valve 175 to the left so that the ports 213 and 215 and 251 and 253 respectively are in alignment, the hammer not having been moved far, the effective steam pressure exerted rightwardly against the surface of piston to force it back to the leftward position is that between the outside diameter of block 191 and the inside diameter of the cylindrical valve 178. The instant, however, that the hammer 175 is moved to its extreme leftward position the full steam pressure then admitted is effective upon the entire internal diameter of the cylindrical valve between the inside diameter of the flange 181. An instant later the piston clears the periphery of the cylindrical valve entirely and the full value of the steam is applied to the entire surface of the piston. The result is a staccato stroke in one direction which has quickly followed a staccato stroke in the other direction. After the full opening of the appropriate ports, in other words, the steam pressure is always the same in total value but the surface of the piston to which it is applied differs in that before the hammer is moved to its extreme position it is limited first to the portion between the block 191 and the flange 181, and then to the center area within that flange and a moment thereafter to the surface of the piston but as the hammer is so moved the effective surface corresponds to the bore of the cylindrical valve.

The above portion of this description and a further consideration of FIGURES 9 and 11–14 the manner in which my engine is controlled will be clear.

As is shown in FIGURES 9, 11, 12 and 13 all control valves are open to the engine, three-way or "free-wheeling" valve 211 being aligned with the feeding conduits 203—205—207. Consequently the previously described quick reciprocation of the cylinders continues. When it is desired to stop the engine or to change its direction of movement (as is not necessary when it is applied to my propulsion system) the main exhaust valve 239 is moved to the closed position shown in FIGURE 14, thus retaining within each cylinder the steam which is therein by preventing escape from the leftward side of piston 161 as illustrated in that figure, thus immobilizing both pistons. During this stoppage the steam which is introduced to conduits 213—215 moves the hammer valve 175 to the completely leftward position. The foregoing description is of course upon the assumption that the valve 239 is closed with the piston 161 instead of the piston 163 at its inward extremity of movement.

If thereafter valve 239 is opened the engine starts again but in the reverse direction because then the opening of valve 239 permits the exhaustion of cylinder 159 and movement of both pistons rightwardly as seen in the drawings. FIGURE 13 illustrates this operation (with movement to the right) as well as the position of the parts as piston 161 moves leftwardly as reversal has been so carried out.

When an operator desires to start the engine in the same direction as before, the valve 239 being closed, he opens it for a moment long enough for the hammer valve 175 to be moved to the opposite position from that it then occupies and then again closes and opens the valve thus starting regular operation in the same direction as before the valve was originally closed and the engine stopped.

When an operator desires my engine to idle, the valve 211 is positioned as in FIGURE 15. Thus the in-put 203 is shut off but the cylinders as they are moved from without the engine are in communication with the atmosphere and can oscillate freely. This adjustment is not necessary when my engine powers my propulsion units. My propulsion circuits are continuously powered in the same direction, change in direction or idling being accomplished by the valving system of these units themselves, later described. If, however, I use my engine for a locomotive, for example, and wish it to "free-wheel" when the steam in-put is closed the pistons could not move except for this valving arrangement.

My regulator valve 209, above described, which is unidirectional in that it does not permit steam to re-enter the boiler, can be operated to control the volume thereof reaching my engine. A pressure control valve may be introduced between this regulator valve and the boiler.

With the addition of conventional pressure and, if desired, automatic volume controls, one basic size of engine can be applied to numerous operations with different power requirements thus facilitating interchangeability. Due to the small number of working parts, ruggedness, and simplicity of design my engine is highly reliable and adequate shaft horse power is obtainable at much less than the present cost. Note that the propulsive gas power, such as steam or air, which is directly applied to the piston operates my equivalent of a slide valve and my novel hammer disk, thus eliminating a large number of working parts with their expense of construction and operation and, most important, loss of power.

My engine is peculiarly adapted for the present invention because it applies power impulses in almost instantaneous succession and also has the above characteristics. Any source of power which will give such impulses can be employed. My engine can be used for many other similar purposes and without modification as a reciprocating pump.

Having described my engine or pump by which I prefer to apply necessary power impulses to my propulsion units previously explained, I now present mechanism by which I illustrate my invention for controlling these propulsion units, a highly important part of my invention.

Upon Sheets seven and eight hereof I first illustrate my control system as exercised by a separate valve applied to one propulsion unit only. Sheets nine and ten illustrate how I immediately and automatically supercede these individual valves with joint control of all of the propulsion units, at will thereafter instantly returning control to the individual valves.

By separate manipulation of each one of a plurality of propulsion units, some situated upon one side of the ship and the others upon the other side, as previously stated, I am able to dispense with a rudder, if desired. Moreover, even if a rudder is present, I can turn a ship more quickly and easily and maneuver it with less difficulty than if I were dependent solely upon a rudder or as a supplement to a rudder alternatively use each of two or more screw propellers for guiding purposes. A ship equipped with my propulsion units generally can be docked without the help of tugs. Either in emergencies or under conditions of ordinary running in fair weather in the open sea the ability to change quickly from individual to joint guiding control and back again is useful.

As previously explained, I power each propulsion unit by admitting propulsion fluid under successive driving impulses in a closed channel into a central operating chamber of each unit and then direct it into either a forward propulsion chamber, a reverse propulsion chamber or both chambers equally when a neutral position is desired. My system which controls such admission is based upon movement of a piston or plunger 95 within a control cylinder 97 housed in the operating chamber to either of three positions with linkage which operates control doors 91 and 93 respectively to open and close openings 89 and 92 respectively of the two propulsion chambers or when in neutral to open both. In one or a first of these positions, say forward, the control piston is at one end of the cylinder and the door to forward propulsion chamber 75 is open and that to reverse propulsion chamber 77 is closed; in another or second, say astern, in the opposite end with the position of the doors reversed from that just described; and in a third position, say neutral, the piston is in the center of the cylinder, with both doors partially open and control pressure upon each side thereof equalized.

It will be readily understood that the system which controls the admission of the propulsion fluid under these successive driving impulses, including the actuating means which move the piston 97 between these three positions, forms a controlling mechanism for governing the application of power to each of said propulsion units. I shall now describe the actuating control for the piston and the doors operated thereby:

To move the piston for each propulsion unit between these three positions I apply a control-liquid 300, incompressible except to a degree of academic interest if at all, under pneumatically applied pressure alternatively to each side of the piston or equalize this pressure when I wish a propulsion unit to operate in neutral. This control liquid is thus applied to each propulsion unit through the connections 115 and 117. The side of the piston upon which the liquid is introduced and the exhaustion or maintenance of its pressure upon the other side or if for the neutral position the balance of pressure upon the different sides of the piston determines the positioning of the piston and hence the control of each of my propulsion units. The amount of control-liquid 300 within each branch of each control circuit is always the same as that within the other branch of that control circuit, but different amounts of this liquid are alternatively disposed within each reservoir in relation to the amount disposed within the operating cylinder. Any liquid displaced from one side of a plunger travels to its reservoir and when liquid is displaced from a reservoid it travels to the cylinder.

The liquid which I employ may be a light oil or glycerine or even distilled water, provided in case of the use of the latter suitable precautions are taken to prevent freezing because unlike the fluid in my closed propulsion circuits this liquid may be exposed to temperatures below freezing.

To move this control-liquid in the manner desired I preferably employ control-air under pressure. The following novel, simple and efficient valving system applies this control-air to the control liquid:

To carry out control as above, in FIGURE 24 (Sheet eight) I show a panel 301 upon which is mounted a plurality of control valves, each generally indicated as 303, herein occasionally called for convenience a "plug valve," by which I govern the introduction of control-liquid 300 into the control cylinders 97 of each propulsion unit. Movement of this control-liquid is actuated by air preferably compressed to two atmospheres (so described hereinafter) which passes through and is exhausted through these plug valves.

As will be seen from FIGURE 25 each control or plug valve 303 through a throat or central channel 313 and appropriate tubing 315 is connected with a source of compressed air housed as within a reservoir 317. In the following description of individual valves, the orientation is from the point of view of FIGURES 16–23.

After I describe this valve as operated to control one propulsion unit independently of all others upon a ship which has a plurality of units, I shall describe how a master valve 401 may disable these separate valves and exercise control in the same manner by directly governing all propulsion units.

Only one valve or actuator, whether individual or master, is illustrated and described in full since all operate similarly so far as the propulsion units are concerned. Each control valve consists essentially of a handle 321 attached to or formed with a crown 323 which makes up an external portion of a solid interior core 325 and also embodies a pointer 327 which cooperates with appropriate indicia. Indicia F for Forward, N for Neutral and S for Astern appear upon the control plate 301 adjacent the pointer 327. Each valve is mounted for revolution within a housing 329 which is disposed largely below the surface of panel 301 and rigid with a base 331. Tube 315 from the source of pneumatic control pressure 317 leads into throat 313 placed below distribution chamber 336 situated within fixed housing 329 and below the solid rotatable valve just described.

This plug valve embodies a vertical central in-put opening 343 aligned with the in-put channel 315 above the chamber 336 and terminating upwardly in two horizontal cross movable in-put tubes 345 and 347 by which the control-air is delivered to the parts operated thereby. The central solid portion of each plug valve is completed by a plurality of bleeding grooves 349, 350, 351, 352 and 353 cut or otherwise formed in its outside surface. Upon appropriate movement of the plug valve, each bleeding groove communicates at its upper end with the atmosphere and at its lower end terminates in the plane of the cross channels and adjacent the vertical abutting surfaces of the valve and its housing, this lower end therefore being closed.

For the correct operation of the valve, handle 321 must be operable in one direction only, shown as clockwise. Therefore a ratchet 355 is rigidly attached to and movable with the plug valve on a depending shaft 356. See FIGURE 18 (Sheet ten). A pawl having a resilient ratchet-engaging finger 357 is supported by a stem 359 disposed in an appropriate vertical slot in the inside wall of distribution chamber 336, this pawl and stem preferably being made of one piece. Any efficient device to secure unidirectional movement can be substituted if desired.

Terminal or control blocks 361 and 362 are attached to fixed valve housing 329 and preferably formed integrally therewith above the upper ends respectively of control tubes 117 and 115, these ends being the ones most distant from the cylinder 97 which is under control. Interposed within tubes 117 and 115 are reservoirs 363 and 364, respectively, preferably transparent, for control-liquid 300. These reservoirs are closed except for the tubes. Pressure of control-air exerted upon the control-liquid within the closed control circuits thus created places this liquid under pressure and exhaustion of the control-air releases such pressure. I thus exercise control of the piston by liquid instead of directly by control-air because the liquid is stable and incompressible and to accomplish the desired result in the release of the pressure upon the cylinder it is more efficient to bleed compressed air than it is to bleed a control-liquid. Moreover, irrespective of the movement of a ship within any limits met within ordinary navigation columns of control-liquid within a reservoir, as just described, always are subject to uniform pressure when air at say two atmospheres is introduced into the respective reservoirs and impinges upon the top of the respective columns.

Within each of these control blocks and extending to and through the adjacent portions of fixed housing 329 are horizontal fixed cross control ducts 365 and 367 respectively which upon the rotation of valve 325 are disposed successively in line and communicate with movable cross pneumatic in-put control channels 345 and 347. Likewise rotation of handle 321 brings the lower ends of the escape grooves 349—353 successively into operational relation with these ducts and hence to the cylinders 97 in order to exhaust from one or both sides of the piston 95 the control pressure in the cylinder as may be necessary for the proper operation of my invention, the upper ends of these escape grooves always being in contact with the atmosphere and the lower always being blocked.

As shown in FIGURE 16 the control handle 321 is set with the pointer 327 in the Forward position F. At this time control-air from reservoir 317 has passed through in-put ducts 343 and 345 to fixed duct 365 which at this setting is in alignment and communicates with reservoir 363 set into tube 117 which leads to the right hand side of piston 95 in control cylinder 97. As clearly shown in the diagrammatic section of FIGURE 16 at the lower end thereof, as well as in FIGURE 2, the resultant pressure of control-liquid upon the rightward side of piston 95 has forced it to its first or extreme leftward position opening door 91 and closing door 93 thus admitting the propulsion fluid into the forward operating chamber 75 of the propulsion unit 35 thus controlled. As will later appear the pressure of the control-liquid against the left side of piston 95 has previously been exhausted. It remains so because the control-air in the top of reservoir 364 through fixed duct 367 communicates with escape groove 352, as clearly shown at the right hand side of FIGURE 17, and thus to the atmosphere, thereby having exhausted the pneumatic pressure upon the control-liquid in reservoir 364. At this point tube 347 is blocked because it abuts a solid surface of the housing 329. Thus the forward propulsion by the unit thus controlled is afforded by successive impulses against diaphragm 79.

It will next be assumed that an operator wishes to neutralize a propulsion unit which is being controlled by applying propulsive fluid in equal force to forward and reverse chambers 75 and 77, both doors being partially open as shown in FIGURE 19. He does so by bringing the piston 95 to the central position shown in FIGURE 19 with equal pressure of control-liquid upon each side of piston 95. This operation cannot be accomplished until the control-liquid to the right of piston 95 in control cylinder 97 is relieved of pneumatic pressure. The control handle, necessarily in a clockwise direction, is moved so that its arrow will point to the uppermost indicium N as shown in FIGURES 19 and 20 at the top thereof. This bodily rotation of plug valve 325 first brings escape notch or groove 349 into operative contact with the channel 365—117 thereby reducing the pressure of control-air in reservoir 363 and of control-liquid to the right of piston 95 to that of the atmosphere. At this point movable cross ducts 345 and 347 are in line with solid portions of fixed housing 329. Consequently no air escapes therefrom. Escape notch 351, however is in line with fixed cross duct 367 and channel 115 thereby placing the reservoir 363 in communication with the atmosphere. It should be understood that this movement from the position of FIGURE 16 (Forward) to that of FIGURE 19 (Neutral) should be slow enough to provide the fraction of a second necessary for the reduction of pressure of control-air upon the control-fluid in reservoir 363 to that of the atmosphere. If desired a braking surface can be applied to the control valve at proper point although I have not found this expedient necessary.

When upon further movement of handle 321 completely to the neutral position horizontal movable cross control channel 347 is aligned with fixed cross duct 367, control-air at two atmospheres will be introduced to reservoir 364 and to the left of piston 95 thus forcing it to the middle position of FIGURE 19. Since at this time channel 117 and duct 365 are blocked the air already to the right of piston 95 will be compressed to approximately two atmospheres and thus will hold the piston 95 against rightward movement beyond the middle position. At this point no escape groove is in contact with the atmosphere.

When an operator desires to admit propulsive fluid to the reverse propulsion chamber he continues movement of the plug valve in a clockwise direction ultimately bringing the pointer 327 in line with the mark S signifying astern. First escape groove 350 comes into contact with the fixed cross duct 367 and channel 115 and simultaneously escape groove 352 with fixed cross duct 365 and channel 117 thus reducing the pressure upon the control-liquid on each side of piston 95 to atmosphere level. As rotation continues to the position of FIGURES 21 and 22 movable cross control duct 347 is brought opposite fixed cross 367 and channel 115 thus admitting control-air at two atmospheres to the top of reservoir 364 and hence to the control-liquid at the leftward side of the piston 95 and moving it to the position shown in FIGURE 21. Horizontal movable cross inlet duct 347 at this point is disposed against a solid inner surface of stationary housing 329. Simultaneously, however, escape groove 352 is aligned with fixed cross duct 365 and channel 117 thus permitting the control-air which otherwise would be trapped to the right of the piston 95 to escape and so that the parts are freely movable to the position as shown in FIGURE 21 and door 93 to reverse chamber 77 opened and door 91 to forward chamber 75 closed.

Disposed between the reverse and forward positions is another neutral position wherein the pointer as viewed in FIGURES 16, 19 and 21 is disposed downwardly. FIGURE 23, in section, illustrates the parts after they have been brought to this position. Intermediate the position shown in FIGURES 21 and 22 on the one hand and 23 on the escape grooves 349 and 351 are aligned with fixed cross ducts 367 and 365 respectively and the upper ends of air tubes 115 and 117 respectively thus reducing the pressure of the control-liquid upon each side of its piston 95 at atmospheric pressure. As the pointer is brought to the downward position as viewed in these sectional figures, control-air is admitted through cross in-let tube 347 to fixed cross duct 365 and tube 117 thus applying control-air to the control-liquid at the right of piston 95. Since at this time channel 115 leading from the left of this piston is blocked by a solid portion of the control valve the air to the left of the piston is compressed thus holding the doors in the middle position shown in FIGURE 19.

The cycle is completed by further clockwise rotation of the valve back to the position shown in FIGURES 16 and 17. During this movement escape notches 350 and 353 are brought into operative relation to stationary cross ducts 365, 367 respectively thus reducing the pressure of control-liquid upon each side of piston 95 to atmospheric level. Further movement of handle 321 brings movable horizontal control duct 345 into alignment with stationary cross duct 365 and tube 117 thus forcing piston 95 from the left or reverse position of FIGURE 21 back to the first or forward position of FIGURE 16. At this time, however, there is no resistance from control-liquid trapped to the left of this piston because there is a free passage for the control-air which applies pressure to this control-liquid through tube 115, stationary cross channel 367 and escape groove 352 which at this point is in contact therewith.

Note that at both neutral positions one of the ducts normally used for the in-put of control-air and its exhaustion when not needed is closed and the other not only open but in contact with control-air at two atmospheres. Thus the side of the piston against which the control-air forces the control-liquid is moved against the trapped control-liquid which in turn compresses the control-air in contact therewith. At this moment this control-air is compressed since it cannot be released thus preventing the movement of the piston beyond a middle position. When on the other hand I desire to move my control plunger to an extreme position either forward or astern I first exhaust the previously employed control-air from contact with each column of control-liquid and thereafter admit control-air at two atmospheres to one column only to press upon one side of the piston while providing free escape of the air from the other side. Thus movement of the piston to its extreme position is permitted.

It should be noted that the indicia shown upon the panel in FIGURE 24 purposely differ from those shown in the sections which make up FIGURES 15, 17, 20, 22 and 23. Because of language difficulties and possible illiteracy it is wisest for the actual positions on the panel of the various indicia to be clear irrespective of language. Thus when the pointer 327 of the upper two of the six valves shown in FIGURE 24 points up it is clear to anyone, literate or not, that that particular propulsion unit is operating to move the ship forwardly. Consequently when the pointer is down as in the second position on the right hand side of the same figure it is equally clear that the propulsion unit which is the second on the starboard side is operative to move the ship astern. The particular arrangement of the valves as shown for purposes of illustration only in FIGURE 24 indicates how my device is employed when it is desired to propel a ship forwardly and at the same time in a large arc to starboard. On the port side two propulsion units are forcing the ship forwardly and one is neutral, while on the starboard side two propulsion units are forcing the ship forwardly and one astern.

Electrical switches for valves which control my engine or engines or the admission of steam thereto may be placed upon this panel is desired. It must be understood, however, that without in any way interfering with the regular uni-directional movement of any engine my system by its valving system changes the direction of application of propulsive force to the ship and if desired applies it in neutral.

There remains description of a form of my invention whereby an operator at will substitutes joint control of all propulsion units for individual separate control and then at his discretion returns to single control. This phase of my invention is particularly useful in emergencies, as for example only, when it is necessary instantly to reverse forward movement of the ship, as to prevent a collision. It is also useful when running in open water under favorable conditions when separate operation of individual propulsion units is not necessary.

As will be seen from FIGURE 26 and later will be described in full, I apply my joint control system to supersede a series of individually operable control valves. Each corresponds exactly to the valves so designated as previously described. Reference characters are not repeated for identical sub-combinations. Each individual valve 303', when operative, feeds and bleeds a control cylinder 97 through tubes 115' and 117', as previously set forth. These tubes or control connections 115' and 117' correspond to tubes 115 and 117 except that pairs of switching valves 405 and 407 and tubes 417 and 419 respectively are interposed in each, as will later be described.

When I operate my joint control actuator or system a master control valve 401 instantly supersedes the individual valves by creating operative connections between each side of the piston in each cylinder and itself and simultaneously blocking those between each cylinder and the individual control valves. Through an electrical circuit 403 this master valve controls two identical three-way switching valves for each individual propulsion unit, one of each pair being generally indicated as 405 and the other as 407, as seen in FIGURES 29 and 30 respectively, these valves thereupon as above stated substituting control channels between the master valve and tubes 115' and 117' for those previously leading to valves 303'.

A reservoir 411 corresponding to reservoir 317 for the individual valves and feeds air under pressure of say two atmospheres through a main in-put lead 413 through branches 415 to each individual valve 303', in the manner of lead 315 and branches 313 (see FIGURE 25), and also feeds master valve 401. A tube 417 extends from each valve 303' to each three-way valve 405 and when unblocked is connected therethrough with tube 115' which operates cylinder 97 in the manner previously described. Another tube 419 extends from each valve 303' to three-way valve 407 of the same pair and when free permits control-liquid from valve 303' to pass into tube 117' to operate each cylinder in a manner previously presented. Reservoirs, not shown, for control liquid are interposed in each tube 115' and 117' as previously described.

Master control valve 401 controls one master liquid-transmitting tube 423 which leads to switching valve 405 of each pair and is connectible therethrough to tube 115'. Another master control tube 427 from master valve 401 leads to the other member 407 of each pair of three-way valves and connects with tube 117' when so permitted by the position of this three-way valve. It will be understood that tubes 427 and 423 are interposed between master valve 401 and these switching valves as operative extensions of tubes 115' and 117'. As the valve 401, which is identical in internal construction with valves 303 and 303', is moved, the openings therein as shown in connection with individual actuators 303 successively come into contact with these extensions and through them operate the controlling mechanisms of each propulsion unit in the manner previously described.

Construction of a three-way switching valve 405 (or 407) satisfactory for my purposes will be understood from FIGURES 29 and 30 but any other which is efficient may be substituted if desired. As shown a relay 428 working against a spring 429 when electrically actuated by circuit 403 through an arm 431 moves a lever 433 directly connected with and effective to operate valve 405 (or 407).

By reason of this construction it will be readily understood that when tubes 417 and 419 leading from each of the valves 303' are blocked by the switching valves 405 and 407 respectively (as shown in FIGURE 30 for tube 419) each individual valve may be set for later operation in any manner desired without interfering with the operation of another propulsion unit and without loss of control-air. Thus before it is desired to go back to operation by an individual valve it may be individually disposed in any desired position. When each control valve is in the position of FIGURE 29 with the master tubes blocked no control-air can escape from master valve 401.

Having described the operation of my system pneumatically and electrically under the control of master actuator or valve 401 I shall now explain how that valve is constructed to make and break the circuit 403.

The master valve or master actuator generally indicated as 401 seen in FIGURES 27 and 28, as previously stated, is constructed exactly as are the individual control valves except for the electrical connections which will first be described and, associated therewith, an "Off" position 445 shown in FIGURE 27 wherein electrical control circuit 403 is broken. Movable with a master control handle 447 having a pointer 449 is a plate 451 upon the bottom of which is a cam formation 453 extending in an arc of approximately 340 degrees. This cam is engageable with a resilient contact-operating lever 455 at its normally upward end as shown in FIGURE 28 carrying a roller or other formation 457 which is engaged and operated by cam 453 as master handle 447 is rotated. Such movement from the Off position, always clockwise as with the individual valves, depresses the resilient lever and operates a microswitch 459 which in turn closes electrical circuit 403 which as has been described blocks channels leading to the individual control valves and opens those leading to the master valve thus placing control therein.

Thus closing of electrical circuit 403 operates all switching valves 405 and 407 to block tubes 417 and 419 leading from tubes 115" and 117' respectively, the construction being the same in every instance except in the one detail already noted, to individual control valves 303'. These channels which are normally open or operable by individual valves 303' include those within valve 303'—connection or tube 417—those within switching valves 405—connection or tube 115'—those of the controlling mechanism within propulsion unit 97; and alternatively the channels within valve 303'—connection or tube 419—those within switching valve 407—connection or tube 117'—those of the controlling mechanism within propulsion unit 97. The blocking of these channels from the individual actuators substitutes open channels from the master control valve 401 through master tubes 423 and 427 leading through the switching valves of FIGURES 29 and 30 to tubes 115' and 117' respectively, depending upon the position of the master valve. Thereafter the master control valve operates all propulsion units jointly. Its construction and operation, once it has been activated as above, is exactly the same as previously described for the individual valves 303'. When the pointer passes to the Off position again and remains there the master control system through the breaking of circuit 403 is disabled and control returned to the individual valves.

A manually operated by-pass switch 461 is provided so that circuit 403 if desired can remain closed when the master valve is operated around to and beyond the Off position and through another cycle, thus avoiding the temporary disablement and re-activation of the individual control valves.

From the immediately preceding portion hereof it will be seen that my control system comprises a closed control circuit including a cylinder with a piston therewithin and one branch from each side of said piston leading to a reservoir and from that reservoir to a common point whereat a valve or individual activator is disposed. The piston is connected with valving or controlling or selecting mechanism which alternatively opens and closes the propulsion or work chambers or leaves each partially open in a neutral position, or more broadly stated means for applying force selectively or alternatively as for example in a forward and rearward direction. In each branch from each side or face of the piston a column of liquid extends to the reservoir, but does not fill the entire portion of its branch because gas must be introduced therein between the common point and the column. Between each reservoir and the common point there is no liquid, although so long as the liquid does not occupy all of each branch the exact point at which it stops is not important, broadly considered. My novel valve is disposed at this common point and upon movement first releases the gas pressure from one of the branches and hence one of the columns and then applies pressure to the other of said columns in the other branch, thereby readily forcing the piston in the desired direction and operating the valving mechanism. I speak of the control circuit as closed because it is and must be closed at certain stages in the cycle by the valve or actuator.

My closed propulsion or work circuit, which preferably is controlled by the above system, as must be understood, is entirely separate therefrom as well as from the water in which the ship floats. It includes a cylinder of a pump or engine which provides the propulsive force, a conduit or conduits leading to the control chamber, in which as a matter of convenience but separated therefrom I dispose my control cylinder of the control circuit, and the control, forward and rearward propulsion chambers. Although I illustrate my control system as applied to my novel propulsion units, with which it has particular usefulness, it can be utilized to control other force-applying mechanisms. Similarly although my propulsion or work circuit is peculiarly adapted to my propulsion units it can be applied to other purposes where a working force is applied as by fluid means. Moreover although my control system is peculiarly adapted for governing the work circuit which I illustrate as above for my propulsion units my work circuit can be controlled in other ways.

The above description, attached drawings and the subjoined claims make evident the advantages of my invention, which include propulsion or work units, a propulsion circuit therefor, an engine for placing a fluid in said unit under intermittent pressure, a control system for said units, and various elements useful in connection therewith, in combination and singly.

I claim:

1. In a marine propulsion system adapted for use to move a ship; said system comprising: a propulsion unit, an elastic motion-transmitting wall for a portion of said unit, a mount for said unit by which the exterior of said elastic wall is submerged in the water in which the ship floats, a closed propulsion circuit containing a propulsive fluid of low compressibility and including the interior of said propulsion unit, and means for placing the fluid within said circuit under intermittent pressure whereby said motion-transmitting portion of said elastic wall of said unit is expanded against said water which surrounds it and motion thereby communicated to the ship.

2. A marine propulsion system adapted for use with a ship, said system comprising an elastic motion-transmitting diaphragm, a fixed surface rigid with said ship and spaced from said diaphragm, a mount rigid with a ship by which an exterior surface of said diaphragm is in contact with water in which the ship floats, and means for delivering a liquid between said fixed surface and the interior of said diaphragm under pressure greater than that of the water thereby stretching said motion-transmitting diaphragm against said water and communicating bodily movement to the ship.

3. In a marine propulsion system adapted for use with a ship having means for intermittently placing a propulsive liquid under pressure; a propulsion unit, said unit including a covering separating its interior from the water in which the ship floats, a portion of said covering comprising an elastic motion-transmitting membrane; a mount by which said unit is submerged in water in which the ship floats with said membrane in contact with said water; and a closed propulsion circuit including said propulsion unit and also including a connection between said liquid and the interior of said unit whereby when said liquid is under pressure it is forced against the interior of said motion-transmitting membrane thereby stretching it and communicating bodily movement to the ship.

4. In a marine propulsion system adapted for use with a ship: means for placing a liquid under continuous pressure substantially the same as that of the water at a predetermined depth in which a ship floats, and means for intermittently increasing said pressure in a series of impulses of greater force than that represented by the pressure of said water at said depth; and a propulsion unit, said unit including a covering separating it from the water in which the ship floats, a portion of said covering comprising an elastic motion-transmitting membrane, a mount by which said unit is submerged in said water at said predetermined depth, and a connection between said liquid and the interior of said unit, whereby when said liquid is under such increased pressure it exerts such force against the interior of said motion-transmitting membrane, said internal force being greater than the external force of said water thereby stretching said motion-transmitting membrane and communicating bodily movement to the ship, the relaxation of said pressure between said impulses while the pressure or external force of said water is greater than that of said internal force permitting the partial collapse of said membrane and the continuation of such internal pressure during the periods between said impulses at a pressure substantially the same as that of the water in which the ship floats protecting said membrane against shock from a following impulse of such greater force.

5. For use for propelling a ship: means for placing a liquid under intermittent pressure and a marine propulsion unit; said marine propulsion unit comprising in combination, a rigid interior framework, a covering for said framework, motion-transmitting portions of said covering being elastic, a mount for attaching said framework with the exterior of said motion-transmitting and elastic covering submerged in water in which a ship floats, and a connection with said means for introducing said liquid within the interior of said unit whereby said elastic covering is stretched under the pressure of said liquid and bodily movement thereby communicated to the ship.

6. A marine propulsion device adapted for use with a ship: said device comprising a forward and a rearward propulsion chamber, a connection by which said device is mounted on the ship below the water line, means for delivering a propulsion liquid to each of said chambers selectively, an elastic motion-transmitting covering for portions of each of said chambers below said water line, and an operable valving mechanism for selectively directing said propulsive liquid into each of said chambers.

7. A marine propulsion unit adapted for use with a ship: said unit comprising a rigid framework, a forward and a rearward propulsion chamber, a control chamber disposed between said propulsion chambers, an elastic covering for each of said propulsion chambers, said coverings for said propulsion chambers being in contact with the water in which the ship floats, valving means within said control chamber, a control member for said valving means, connections between said control member and said valving means for moving said valving means between a first position in which it closes the forward of said propulsion chambers and opens the rearward of said propulsion chambers and a second position in which it closes the rearward of said propulsion chambers and opens the forward thereof and a third or neutral position in which each propulsion chamber is in communication with said chamber, means for moving said control member between said positions, and means for introducing a propulsive fluid under pressure within said central or control chamber and therethrough selectively into said propulsion chambers depending upon the position of said valve.

8. For use with a ship: a marine propulsion unit and a closed propulsion circuit through which a propulsion liquid is forced under pressure, and means for exerting pressure upon said propulsion liquid, said pressure exerting means embodying instrumentalities for intermittently increasing said pressure; said unit comprising a rigid framework, said unit being attached to the ship below the water line and parallel to its longitudinal axis, a central control chamber within said unit, a forward and a rearward propulsion chamber each disposed upon a different side of said control chamber, an elastic motion-transmitting covering for each of said forward and rearward chambers, said coverings being disposed substantially at right angles to said axis and the external surface of each engaging the water in which the ship floats, a valve for each of said propulsion chambers disposed between it and said control chamber, and an operable control device for said valves within said control chamber for alternatively opening and closing each valve and selectively opening both valves; said closed propulsion circuit including the interior of said chambers and a connection with said presure-exerting means for introducing a propulsion liquid under intermittent pressure into said control chamber, said liquid engaging the interior surface and stretching one or both of said coverings in accordance with the position of said valves.

9. For use with a ship: a marine propulsion unit, a closed propulsion circuit for said unit, and means for placing a propulsion fluid under pressure in said circuit; said propulsion unit comprising a forward propulsion chamber and a rearward propulsion chamber, an elastic motion-transmitting covering for at least a portion of each of said chambers, a connection for attaching said unit to the ship below the water line, and control mechanism for selectively directing said fluid to one of said chambers only whereby propulsion forwardly or rearwardly is secured and alternatively to both of said chambers whereby the propulsive force of said fluid is exerted upon each of said coverings thereby neutralizing their propulsive effect upon the ship; and said propulsion circuit including the interior of said chambers, and a connection between said pressure-producing means and the interior of said chambers.

10. In a marine propulsion system adapted for use with a ship: a plurality of propulsion units, at least one being disposed upon each side of the ship, each of said units comprising a forward and a rearward propulsion chamber, a mount for each of said units upon the exterior of the ship below the water line and generally parallel to its longitudinal axis, means for delivering propulsive liquid under pressure to said chambers, an elastic motion-transmitting membrane forming at least a portion of one wall of each of said chambers below said water line, an operable valving mechanism for selectively directing said propulsive liquid into each of said chambers of each of said units for delivering said propulsive liquid against said elastic membrane thereby propelling the ship, and a control for each of said valving mechanisms disposed for selectively operating each of said valving mechanisms and hence each of said units.

11. A marine propulsion system adapted for use with a ship: said system comprising a plurality of propulsion units, at least one being disposed upon each side of the ship, each of said units comprising a forward and rearward propulsion chamber, a mount for attaching each of said units on the exterior of the ship below the water-line and generally parallel to its longitudinal axis, means for delivering a propulsive liquid to each of said units, an elastic motion-transmitting membrane forming one wall of each of said chambers below said water-line, an operable valving mechanism for selectively directing said propulsive liquid into each of said chambers of each of said units, and control means for each and all of said valving mechanisms, said control means comprising a separate actuator independently operative for each of said valving mechanisms, a master actuator for simultaneously operating all of said mechanisms, and connections between said individual actuators and said master actuator for disabling all of said individual actuators upon the operation of said master actuator.

12. A marine propulsion system adapted for use with a ship: said system comprising a plurality of propulsion units, at least one being disposed upon each side of the ship, each of said units comprising a forward and a rearward propulsion chamber, a mount for attaching each of said units on the exterior of the ship below the waterline and generally parallel to its longitudinal axis, delivering a propulsive liquid to each of said units, an elastic and motion-transmitting membrane-transmitting membrane forming one wall of each of said chambers below said water-line, an operable valving mechanism for selectively directing said propulsive liquid into each of said chambers of each of said units, and control means for each and all of said valving mechanisms, said control means comprising an individual or separate actuator for each of said valving mechanisms, a plurality of control positions into which each of said separate actuators is movable at will, an individual operating connection between each of said individual actuators and said valving mechanisms for operating said one valving mechanism and its propulsion unit in accordance with the disposition of said individual actuator in said control positions, a master actuator for simultaneously operating all of said mechanisms, a plurality of control positions corresponding to each of said control positions of each of said separate actuators into each of which said master actuator is movable at will, operating connections between said master actuator and all of said valving mechanisms for simultaneously operating all of said valving mechanisms and hence all of said propulsion units in accordance with the control position into which said master actuator has been moved, and operating connections between each of said individual actuating connections and the corresponding actuating connection of said master actuator for disabling all of said individual actuating connections upon the operation of said master actuator whereby all individual actuators are rendered inoperable and all valving mechanisms operable only by said master actuator.

13. A marine propulsion system adapted for use with a ship; said system comprising a plurality of propulsion units, at least one being disposed upon each side of the ship, each of said units comprising a forward and a rearward propulsion chamber, a mount for attaching each of said units on the exterior of the ship below the water-line and generally parallel to its longitudinal axis, a connection for the delivery of a propulsive liquid to each of said units, an elastic motion-transmitting membrane forming one wall of each of said chambers below said water-line, an operable valving mechanism for selectively directing said propulsive liquid into each of said chambers of each of said units, and control means for each and all of said valving mechanisms, said control means comprising an individual or separate actuator for each of said valving mechanisms, a plurality of control positions into which each of said separate actuators is movable at will, an individual operating connection between each of said individual actuators and one of said valving mechanisms for operating said one valving mechanism and its propulsion unit in accordance with the disposition of said individual actuator in said control positions, a master actuator for simultaneously operating all of said mechanisms, a plurality of control positions corresponding to each of said control positions of each of said separate actuators into each of which said master actuator is movable at will, operating connections between said master actuator and each of said control positions and all of said valving mechanisms for simultaneously operating all of said valving mechanisms and hence all of said propulsion units in accordance with the control position into which said master actuator has been moved, operating connections between each of said individual actuating connections and the corresponding actuating connection of said master actuator for disabling all of said individual actuating connections upon the operation of said master actuator whereby all individual actuators are rendered inoperable and all valving mechanisms operable only by said master actuator, and means for disabling said master actuator, said operating connections including instrumentalities which upon the disabling of said master actuator again render each individual actuator operative at its position prior to the operation of said master actuator, said individual actuators being selectively operable at will between each disabling thereof by the operation of said master actuator.

14. A marine propulsion system adapted for use with a ship; said system comprising a plurality of propulsion units, at least one unit being disposed upon each side of the ship, a mounting for attaching each of said units to the exterior of the ship below the water-line, controlling mechanism for governing the application of power to each of said units, an individual or separate actuator for each of said controlling mechanisms, control connections between each individual actuator and each of said controlling mechanisms, a master actuator, control connections between said master actuator and said controlling mechanisms of each of said propulsion units, and operating connections between said control connections of said master actuator and said control connections of said individual actuators for disabling said individual actuators upon the operation of said master actuator, whereby successively at will each of said propulsion units can be operated separately and alternatively all can be operated jointly.

15. A marine propulsion system according to claim 14, said control operating connections between said master actuator and the control connections of said individual actuators including instrumentalities which upon the disabling of said master actuator again render each of said individual controlling mechanisms operative at its operational position prior to the operation of said master actuator, said individual mechanisms being selectively operable at will between each disabling thereof by the operation of said master actuator.

16. A marine propulsion system adapted for use with a ship; said system comprising a plurality of self-contained propulsion units, at least one unit being disposed upon each side of the ship, a mounting for each of said units on the ship below the water-line; each of said units comprising a forward propulsion element and a rearward propulsion element and control mechanism for selectively applying power to each of said elements of each of said units an individual or separate actuator for each of said controlling mechanisms, a master actuator operatively connectable to said controlling mechanism of each of said propulsion units, and means operated by the movement of said master actuator to operating connection with said controlling mechanisms for rendering each of said individual actuators inoperable.

17. A marine propulsion system adapted for use with a ship; said system comprising a plurality of propulsion units, at least one unit being disposed upon each side of the ship, a mounting for attaching each of said units to the exterior of the ship below the water-line, an individual controlling mechanism having a plurality of operational positions for governing the application of power to each of said units, an individual or separate actuator for each of said controlling mechanisms, a control connection between each of said individual actuators and each of said controlling mechanism, a master actuator for simultaneously operating all of said mechanisms, and control connections between said master actuator and said control connections between each actuator and its controlling mechanism for first disabling all of said control connections of said individual actuators thereby rendering said individual actuators inoperative before said master actuator can operate said controlling mechanisms, whereby successively at will each of said propulsion units can be operated separately and alternatively all can be operated jointly.

18. A marine propulsion system adapted for use with a ship; said system comprising a plurality of self-contained propulsion units, at least one unit being disposed upon each side of the ship, a mounting for each of said units on the ship below the water-line; each of said units comprising a forward propulsion element and a rearward propulsion element and controlling mechanisms for selectively applying power to each of said elements of each of said units; a separate independently operable actuator for each of said controlling mechanisms, a master actuator, switching means for alternatively disabling said individual actuators and rendering said master actuator operable upon all of said controlling mechanisms, and connections between said master actuator and each of said switching means for operating said switching means prior to the operation of said master actuator to render all of said individual actuators inoperable.

19. In a marine propulsion system adapted for use with a ship, a propulsion unit: said propulsion unit including a propulsion chamber, an elastic motion-transmitting membrane forming a portion of an external wall of said chamber disposed angularly to the longitudinal axis of the ship and submerged in water in which the ship floats, a cylinder, a piston within said cylinder, a connection between said cylinder and the interior of said chamber; said cylinder, piston, said connection and the interior of said chamber comprising a closed propulsion system; and means for subjecting said piston to quick movement thereby forcing a liquid of low compressibility disposed within said closed system to sudden and intermittent reciprocating movement and against the interior of said membrane thereby stretching it at substantially right angles to said longitudinal axis and communicating bodily movement to the ship.

20. In a marine propulsion system adapted for use with a ship, a propulsion unit: said propulsion unit including a propulsion chamber, said propulsion chamber having an externally disposed elastic motion-transmitting membrane, a mount for attaching said unit to the ship below the surface of the water in which the ship floats, said elastic membrane being disposed angularly to the longitudinal axis of the ship, and a closed propulsion circuit; said closed propulsion circuit including said chamber and a cylinder and a connection between said chamber and said cylinder, a liquid of low compressibility being disposed within said closed circuit; a piston operative in said cylinder against liquid, means for intermittently and suddenly appling force to said piston to move it against said liquid thereby stretching said membrane at a susbtantial angle to said longitudinal axis and thereby imparting movement to the ship, and means for maintaining said piston and hence said liquid under relaxed pressure substantially the same as that of the water in which the ship floats during the periods between said power-applying impulses.

21. A marine propulsion system adapted for use with a ship; said system including at least one propulsion unit, a closed propulsion circuit including a portion of said unit, and a control system; each of said propulsion units comprising a rigid framework, a forward and a rearward propulsion chamber, a control chamber disposed between said propulsion chambers, valving means for selectively opening and closing said chambers, an elastic motion-transmitting covering for at least a portion of each of said propulsion chambers; a mount for said unit upon which it is disposed in contact with the water in which the ship floats with said elastic coverings in line with the longitudinal axis of the ship; said closed propulsion circuit including said propulsion and control chambers, a susbtantially incompressible liquid being disposed within said propulsion circuit, engine means for maintaining said propulsion liquid under minimum pressure at least equal to substantially that of the water in which the ship floats and for intermittently and suddenly subjecting said propulsion liquid to relatively great momentary increase in pressure, said increase in pressure during its duration expanding one of said elastic coverings of said propulsion unit and transmitting motion and thereby causing the ship to move, the maintenance of said minimum pressure between said intermittent impulses protecting said coverings from shock when said pressure is later increased, and a connection between said engine means and said control chamber; and said control system including a hydraulic control circuit, said circuit including a control cylinder and a piston disposed therewithin, a connection between said piston and said valving means for selectively opening and closing said chambers by movement of said piston, said control circuit having two branches one upon each side of said piston joining at a common point relatively remote from said piston, a reservoir disposed in each of said branches between said common point and said piston, a substantially incompressible control liquid disposed in each branch and disposable in each reservoir and engaging each side of said piston respectively and leaving a portion of each branch relatively near said common point unoccupied thereby, a source of gas under pressure, and a gas-control valve operatively engaging each of said branches at said common point, inputs for said gas to said gas control valve, said gas-control valve including instrumentalities for first opening one branch of said control circuit to release gas pressure therein and instrumentalities for thereafter connecting the other of said branches to said source of gas thereby placing the control liquid under pressure and moving said piston in a manner desired selectively to open and close said chambers.

22. A marine propulsion system for a ship, said system including at least one propulsion unit, a mount for said unit upon which it is disposed in contact with the water in which the ship floats, a source for applying power to said unit, and a control system; forward and rearward propulsion means disposed in said unit and selecting mechanism for alternatively rendering each of said propulsion means operative and inoperative; said control system including a hydraulic control circuit, said circuit including a control cylinder and a piston disposed therewithin, a connection between said piston and said selecting mechanism by which said mechanism alternatively renders said forward and rearward propulsion means operative and inoperative by movement of said piston, said control circuit having two branches, one upon each side of said piston and joining at a common point relatively remote from said piston, a reservoir disposed in each of said branches between said common point and said piston, a substantially incompressible control liquid disposed in each branch and disposable in each reservoir and engaging each side of said piston respectively and leaving a portion of each branch relatively near said common point unoccupied thereby, a source of gas under pressure, and a gas-control valve operatively engaging each of said branches at said common point, inputs for said gas to said gas control valve, said gas-control valve including instrumentalities for first opening one branch of said control circuit to release gas pressure therein and instrumentalities for thereafter connecting the other of said branches to said source of gas thereby placing the control liquid under pressure and moving said piston in a manner desired selectively to operate said propulsion means.

23. In combination, a propulsion unit adapted for use with a ship and rigidly attached thereto; means for placing a virtually incompressible propulsive fluid under pressure and intermittently increasing said pressure above that of the virtually incompressible water in which the ship floats; a propulsion chamber in said unit; said chamber having an exterior motion-transmitting wall the outer surface of which continuously engages the water in which the ship floats and contains at least a susbtantial portion which is movable relatively to said chamber and against said water, an interior wall spaced from said first-mentioned wall and which during propulsive operation is rigid with said unit; and a connection for delivering said pressurized propulsive fluid to said chamber between said walls and against the inner surface of said first mentioned wall; whereby the pressure of said fliud when thus increased thrusts said portions of said first mentioned wall against the virtually incompressible water while said propulsive fluid transmits from the water to said interior wall rigid with the ship force of such thrust and propels the ship.

24. A marine propulsion system adapted for use with a ship, said ship having a source of unidirectional fluid power; said propulsion system including at least one self-contained propulsion unit: said unit comprising a forward-propulsion chamber and a rearward-propulsion chamber, an elastic motion-transmitting membrane enclosing a portion of each of said chambers and engaging the water in which the ship floats, and control mechanism for selectively applying fluid power to each of said chambers and hence to said membranes whereby motion is accordingly transmitted to the ship.

25. A system according to claim 23 including a continuously inwardly extending channel upon at least one side of the hull of the ship below the water line and within projections of the planes of both the bottom of the ship and its sides, and a mount for said chamber being so disposed within said channel that said propulsion unit is wholly within said channel thereby being protected from floating obstructions in the water in which the ship floats and the streamlining of said hull not being broken.

References Cited in the file of this patent

UNITED STATES PATENTS

| | | |
|---|---|---|
| 179,407 | Eckhardt | July 4, 1876 |
| 286,477 | O'Brien | Oct. 9, 1883 |
| 525,731 | Walther | Sept. 11, 1894 |
| 538,633 | Walther | Apr. 30, 1895 |
| 550,037 | Bond | Nov. 19, 1895 |
| 1,703,722 | Carozzi | Feb. 26, 1929 |
| 1,716,400 | Weis | June 11, 1929 |
| 1,851,666 | Evans | Mar. 29, 1932 |
| 2,240,163 | Pick | Apr. 29, 1941 |
| 2,277,573 | Wichorek | Mar. 24, 1942 |
| 2,347,785 | Lovell | May 2, 1944 |
| 2,524,184 | Wiggins | Oct. 3, 1950 |
| 2,699,729 | Stevens | Jan. 18, 1955 |
| 2,735,404 | Komph | Feb. 21, 1956 |
| 2,759,456 | Court | Aug. 21, 1956 |

FOREIGN PATENTS

| | | |
|---|---|---|
| 482,467 | France | Dec. 30, 1916 |